(12) United States Patent
McKegney et al.

(10) Patent No.: US 12,015,610 B2
(45) Date of Patent: *Jun. 18, 2024

(54) SECURE ONLINE ID VALIDATION AND REVIEW SYSTEM

(71) Applicant: Namecheap, Inc., Phoenix, AZ (US)

(72) Inventors: Phillip McKegney, Milton (CA); Hicham Al Mallah, North Maten (LB)

(73) Assignee: Namecheap, Inc., Phoenix, AZ (US)

(*) Notice: Subject to any disclaimer, the term of this patent is extended or adjusted under 35 U.S.C. 154(b) by 440 days.

This patent is subject to a terminal disclaimer.

(21) Appl. No.: 17/366,970

(22) Filed: Jul. 2, 2021

(65) Prior Publication Data

US 2021/0336953 A1 Oct. 28, 2021

Related U.S. Application Data

(63) Continuation of application No. 16/443,746, filed on Jun. 17, 2019, now Pat. No. 11,057,380.

(51) Int. Cl.
*H04L 29/06* (2006.01)
*G06F 16/22* (2019.01)
(Continued)

(52) U.S. Cl.
CPC .......... *H04L 63/0884* (2013.01); *G06F 16/22* (2019.01); *G06F 16/245* (2019.01);
(Continued)

(58) Field of Classification Search
CPC . H04L 63/0884; H04L 63/0861; H04L 63/30; G06F 16/22; G06F 16/245; G06F 16/248; G06F 21/62; G06Q 50/265
See application file for complete search history.

(56) References Cited

U.S. PATENT DOCUMENTS 8,520,908 B2 8/2013 Bladel et al.
8,995,774 B1 3/2015 van Deventer et al.
(Continued)

FOREIGN PATENT DOCUMENTS

CN 1447948 A 10/2003
CN 105264487 A 1/2016
(Continued)

OTHER PUBLICATIONS

U.S. Appl. No. 16/443,746, filed Jun. 17, 2019, 11,057,380, Jul. 6, 2021.
(Continued)

*Primary Examiner* — Noura Zoubair
(74) *Attorney, Agent, or Firm* — HAYNES BEFFEL & WOLFELD LLP; Andrew L. Dunlap; Paul A. Durdik

(57) ABSTRACT

A method of detecting fraudulent activity during authenticating users and user identifications includes initiating a user's device to capture a sequence of images of the user to be authenticated commencing when the camera is operational and prior to receiving from the user a selection of the control that triggers capture of images and continuing until detecting that the user has selected the control to trigger capture of images, thereby enabling capture of activity performed by the user prior to and contemporaneous with selecting the control, including any attempted fraudulent activity of the user to be authenticated. Video, still images and audio of the user seeking authentication can be captured.

20 Claims, 18 Drawing Sheets

(51) Int. Cl.
*G06F 16/245* (2019.01)
*G06F 16/248* (2019.01)
*G06F 21/62* (2013.01)
*G06Q 50/26* (2012.01)
*H04L 9/40* (2022.01)

(52) U.S. Cl.
CPC ............ *G06F 16/248* (2019.01); *G06F 21/62* (2013.01); *G06Q 50/265* (2013.01); *H04L 63/0861* (2013.01); *H04L 63/30* (2013.01)

(56) References Cited

U.S. PATENT DOCUMENTS

| | | | |
|---|---|---|---|
| 9,495,586 B1 | 11/2016 | Tagen et al. | |
| 9,641,752 B2 | 5/2017 | Mattes | |
| 9,740,926 B2 | 8/2017 | Hagen et al. | |
| 10,693,872 B1 | 6/2020 | Larson et al. | |
| 2018/0206124 A1* | 7/2018 | Mahaffey | H04W 4/025 |
| 2019/0205680 A1* | 7/2019 | Miu | G06V 40/45 |
| 2019/0213316 A1* | 7/2019 | Tussy | G06V 40/50 |
| 2020/0118375 A1* | 4/2020 | Tagawa | G07B 15/00 |
| 2020/0366671 A1* | 11/2020 | Larson | G06F 9/451 |

FOREIGN PATENT DOCUMENTS

| | | | |
|---|---|---|---|
| WO | 2005067384 A3 | 12/2005 | |
| WO | 2015084710 A1 | 6/2015 | |

OTHER PUBLICATIONS

U.S. Appl. No. 16/443,746—U.S. Notice of Allowance dated Mar. 9, 2021, 28 pages.

\* cited by examiner

☑ Validation | Submission Agents Categories Support 🔍 (PM)

⌄ ADVANCED SEARCH

| STATUS | KAYAKO TICKET ID | CATEGORY | SUBMISSION ID(4) | AGENT | LINK GENERATED | SUBMISSION DATE | REVIEWED DATE |
|---|---|---|---|---|---|---|---|
| ☐ | UOK-254-47990 | Payment Verification | 6DD4AD3BB3EFDC6CBEEEAA8963169SE0 | 🔍 | 2018-10-04 09:41UTC | 2018-10-04 12:04UTC | 2018-10-17 09:58UTC |
| ☐ | rel.to UOK-254-47990 | Payment Verification | 885F6E9787E4B959CEF4E7EDBCC1925 | 🔍 | 2018-10-04 09:46UTC | 2018-10-04 10:11UTC | 2018-10-06 02:47UTC |
| ☐ | UOK-254-47990 | Payment Verification | DCCA2A363B5D289B53BD646E03D662B3 | 🔍 | 2018-10-02 17:07UTC | 2018-10-02 17:38UTC | 2018-10-06 20:49UTC |
| ☐ | UOK-254-47990 | Payment Verification | 7802680291269l2BA9C9E340EA2FD93F | 🔍 | 2018-10-02 14:28UTC | 2018-10-02 14:41UTC | 2018-10-02 16:53UTC |

Clear Search  (+)

SECURE ONLINE ID VALIDATION AND REVIEW SYSTEM

PRIORITY APPLICATION

This application is a continuation of U.S. patent application Ser. No. 16/443,746, entitled "SECURE ONLINE ID VALIDATION AND REVIEW SYSTEM," filed Jun. 17, 2019. The non-provisional application is incorporated by reference for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE TECHNOLOGY DISCLOSED

The technology disclosed relates generally to security for network delivered services, and in particular relates to managing sensitive client information with tools and techniques for submitting documents that are secure.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Enterprise organizations have a need to authenticate users seeking access to websites, or other network based resources. Authentication over network necessitates receiving, and storing sensitive data, such as personally identifiable information (PII) as well as potentially financial or patient information, intellectual property (IP) and other information, depending on the business and industry. For example, personally identifiable information refers to information which can be used to distinguish or trace an individual's identity, such as their name, Social Security number, and biometric records, alone, or when combined with other personal or identifying information which is linked or linkable to a specific individual, such as date and place of birth and mother's maiden name. Machines capture personally identifiable information using cameras generally, but contact fingerprint scanners, microphones and other sensors can be used. Sources of personally identifiable information include state issued identification documents, passports, driving permits, residency permits, birth, marriage and death certifications, military induction, orders and discharges and the like, professional licenses such as licenses to practice medicine, law, dentistry, professional engineer, and many others.

Common mechanisms by which fraudsters attempt to gain access to an enterprises' network assets include the presenting a falsified identification. The falsified identification typically includes a picture of a user that the fraudster desires to impersonate, or a stolen photo ID, or a picture of a photo ID belonging to someone else.

Conventionally, fingerprint scanners, facial recognition and the like have been implemented in efforts to validate the prospective user. Such automated approaches have met with some successes, however there are also drawbacks. Many organizations are reticent to leave control over access to sensitive data and/or system resources to automated approaches alone. Algorithms can fail, hardware can be reverse engineered, and the fraudsters are continually improving and inventing new techniques for defeating these automatons.

Accordingly, an opportunity arises for the development of an improved tools that enable members of the public to easily submit their ID documents for authentication or validation online for review by an agent of the business seeking to authenticate the submitting user, thereby reducing friction between authenticator and authenticatee, reducing frustration, and enabling the potential for faster account access by legitimate customers.

SUMMARY

Described with reference to example implementations are systems and methods for detecting fraudulent activity during authenticating users and user identifications. The disclosed technology provides method and security service system implementations that enable an authorized representative of the security service system or other person or an organization seeking to detect fraudulent activity and to prevent fraud (e.g., a Partner User, Agent, or Challenger) to request a dynamically configurable set of pieces of identification from any person (i.e., the Public User, Candidate, or user seeking to be authenticated) attempting an action where the Partner user requires proof of identity to proceed with the transaction or action.

Implementation specific authentication criteria and authentication processes can vary among organizations seeking to detect fraudulent activity and prevent fraud using the disclosed technology. Authentication and fraud detection can be performed by the organization seeking to authenticate members of the public as potential customers, clients, employees or vendors. Alternatively, or additionally, authentication can be outsourced to be performed by a trusted third party working in collaboration with the organization.

In one implementation, the candidate receives a link (i.e., authentication request, or challenge) that, when activated, prompts the candidate user to present to a camera of their user device one or more identification documents and to present their face and to select a control to trigger capture of images of the one or more identification documents and face of the user by the user device the system. Prompting can include showing the candidate instructions indicating the system will take pictures of the candidate (i.e., a selfie), their ID, and any other required documents indicated by the challenge using the camera of the user's device in an easy to follow process. When pictures are taken, the system can capture multiple images before and after the user selects the camera control (e.g., shutter) of their device. In one implementation, a sequence of images is captured similar to 'burst' functions found on a smart phone. The captured images can be stored in an encrypted non-image format, for example.

Actions and physical characteristics of persons seeking to be authenticated can be captured by video, image capture, audio, or other recording mechanisms of a device or terminal being used, encrypted, stored for later retrieval and review by trusted individuals (agents, representatives, etc.) of the person or organization seeking to detect fraudulent activity and to prevent fraud. Once authenticated, a person's credentials can be stored under the authenticated person's control and knowledge, thereby achieving generalized data privacy regulation (GDPR) compliance.

Some implementations will provide improved rates of detection of fraudsters and fraudulent activity. Many implementations provide secure storage of captured identity information using encryption. Specific implementations can provide users with the ability to detect multiple instances of fraudulent activity that are related. Other aspects and advantages of the present invention can be seen on review of the drawings, the detailed description and the claims, which follow. Some implementations bring customer service or risk team members as close to face to face as is possible for the digital economy. The team reviews customer submissions using a Client Document Management tool; thereby enabling authentication to be performed better than conventional approaches and more secure than conventional approaches.

BRIEF DESCRIPTION OF THE DRAWINGS

FIGS. 6A, 6B and 6C illustrate various panels of a user interface and showing finding potentially related fraudulent activities in one implementation.

DETAILED DESCRIPTION

Figure 1:
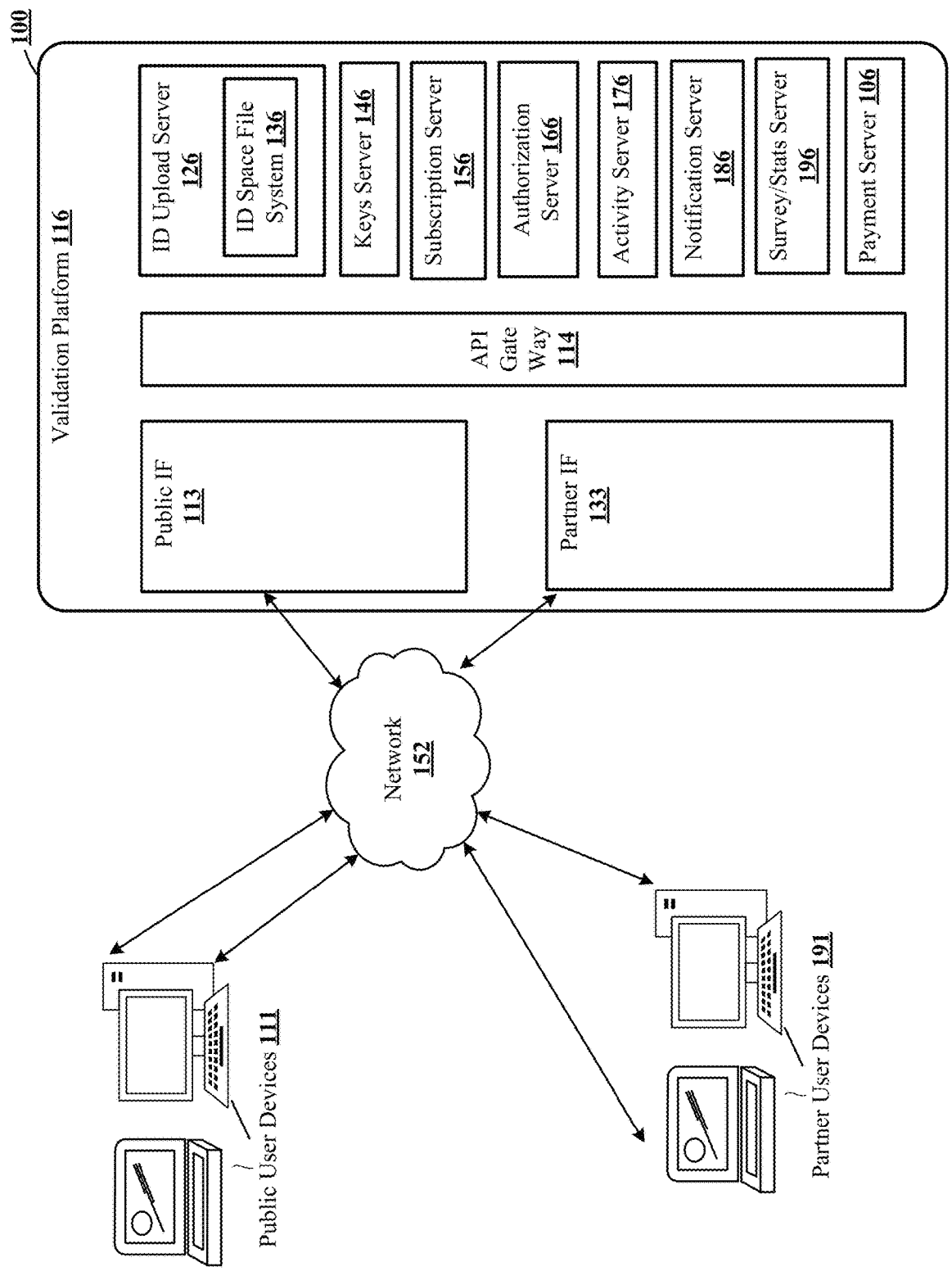
FIG. 1 is a simplified diagram of one environment 100 implementing detecting fraudulent activity during authenticating users and user identifications.

Asking customers or users for identification (ID) is something that companies do every day. For many businesses, knowing who you're interacting with online can make the difference between success and failure. Failure can come in the form of security failures, GDPR compliance failures, chargebacks, know your customer (KYC) issues, account takeovers, friendly fraud (i.e. requesting a chargeback from the bank by the consumer making a purchase), and others.

The explosive growth of cloud applications and, in particular, Software-as-a-Service (SaaS) applications has changed the way organizations do business. Lower maintenance costs, increased uptime, faster feature rollout, and the reduced need for on-site hardware are just some of the reasons why cloud-based SaaS solutions are making deep and fast inroads to tasks that were formerly dominated solely by face-to-face human interactions. User Identity Management (UIM) on SaaS applications is difficult, time consuming, and expensive. To address the challenges and cost of UIM, many enterprises that subscribe to SaaS applications are turning to Identity-as-a-Service (IDaaS) solutions to easily create and manage user identities across their entire portfolio of SaaS. application subscriptions, which usually span multiple platforms and can change often.

The disclosed technology provides method and security service system implementations that enable an authorized representative of the security service system or other person of an organization attempting to prevent fraud (i.e., the Partner User, Agent, or Challenger) to request a dynamically configurable set of pieces of identification from any person (i.e., the Public User, Candidate, or user seeking to be authenticated) attempting an action where the Partner user requires proof of identity to proceed with the transaction or action.

In many approaches, algorithms are relied upon to authenticate users. Relying on algorithms is an arms race between authenticator and fraudster, however, and it is too simple for the fraudster to buy pictures of stolen credit cards and identity cards online. Implementation specific authentication criteria and authentication processes can vary among organizations seeking to detect fraudulent activity and prevent fraud using the disclosed technology. Authentication and fraud detection can be performed by the organization seeking to authenticate members of the public as potential customers, clients, employees or vendors. Alternatively, or additionally, authentication can be outsourced to be performed by a trusted third party working in collaboration with the organization.

In one implementation, the candidate receives a link (i.e., authentication request, or challenge) that, when activated, prompts the candidate user to present to a camera of their user device one or more identification documents and to present their face and to select a control to trigger capture of images of the one or more identification documents and face of the user by the user device the system. Prompting can include showing the candidate instructions indicating the system will take pictures of the candidate (i.e., a selfie), their ID, and any other required documents indicated by the challenge using the camera of the user's device in an easy to follow process. When pictures are taken, the system can capture multiple images before the user selects the camera control (e.g., shutter) of their device. In one implementation, a sequence of images is captured similar to 'burst' functions found on a smart phone. The captured images can be stored in an encrypted non-image format, for example.

Captured images can be provided to the authorized representative by a browser accessible portal in a non-image format, in a review panel for the authorized representative, where the authorized representative is provided the ability to compare the picture submitted as the candidate's captured face picture to the picture submitted as the candidate's captured ID picture, and to review the accessory photos taken before the candidate activates the camera control to capture a picture (i.e., the timeline).

The use of the timeline enables a challenger to determine whether the picture provided by the candidate to their device is actually genuine or fraudulent because the timeline enables the challenger to clearly identify that when the candidate is presenting their own face to their device, or fraudulently presenting an image, either a photograph, cellphone image or monitor image in place of the candidate's own face. Optionally, a zoom lens tool enables close-up inspection by the challenger of details of a candidate's images.

Environment

FIG. 1 is a simplified diagram of one environment 100 implementing detecting fraudulent activity during authenticating users and user identifications, mediating access by authenticated users to stored credentials used to authenticate with services and with one another, and creation, management and storage of encryption keys to control access to and use of stored credentials by other applications on app servers, and to access a secure backend system. Environment 100 includes validation platform 116 for an enterprise or organization, which includes a public IF 113 implementing a front end and user interface through which public users can authenticate using their public user devices 111 connected to validation platform 116 via network 152 and partner users prepare requests for authentication and review credentials gathered by authentication using their partner user devices 191 connected to validation platform 116 via network 152. Implementations are application specific and may include other components more-or-less standard to implement functionality with greater efficiency, such as load balancers, duplicate database servers, shadow servers, mirroring servers, backup servers and the like not shown by FIG. 1 for clarity sake.

Validation platform 116 implements a micro-services architecture that includes an API gateway 114 that acts as an abstraction layer that routes requests within the validation platform 116, and sends the requests to the respective micro-services, thereby enabling micro-services to be protected from public disclosure. An ID upload server 126 is coupled via the API gateway 114 with public IF 113 and partner IF 133 and implements authentication requests by partners and responses and submissions by public users, enabling the partner users to configure requests for credentials, send the requests to members of the public, examine credentials submitted by the public users, and approve or reject public user authentication requests. Images captured from a user device are sent by the public user interface 113 to the API gateway 114 with a token and are routed by the API gateway 114 to the ID upload server 126. The ID upload server 126 includes ID space file system 136 in which encrypted sequences of images are stored using string base 64 format. In one implementation, encryption conforms to Advanced Encryption Standard 256 (AES-256). The string base 64 format images are stored on a server inaccessible to the user seeking to be authenticated. The ID space file system 136 can be implemented as a filesystem in user space (FUSE) in which multiple users create file systems for their individual use. The ID space file system 136 includes temporary memory, also referred to as volatile storage, and semi-permanent or non-transitory storage as well. Some implementations can utilize a solid state file system such as NFS-Ganesha user-mode file server. Validation platform 116 further includes keys server 146, subscription server 156, authorization server 166, activity server 176, notification server 186, survey statistics server 196, and payment server 106, which work cooperatively in conjunction with ID upload server 126, public IF 113 and partner IF 133 as will be described in further detail with reference to FIGS. 2 and 3.

Figure 2:
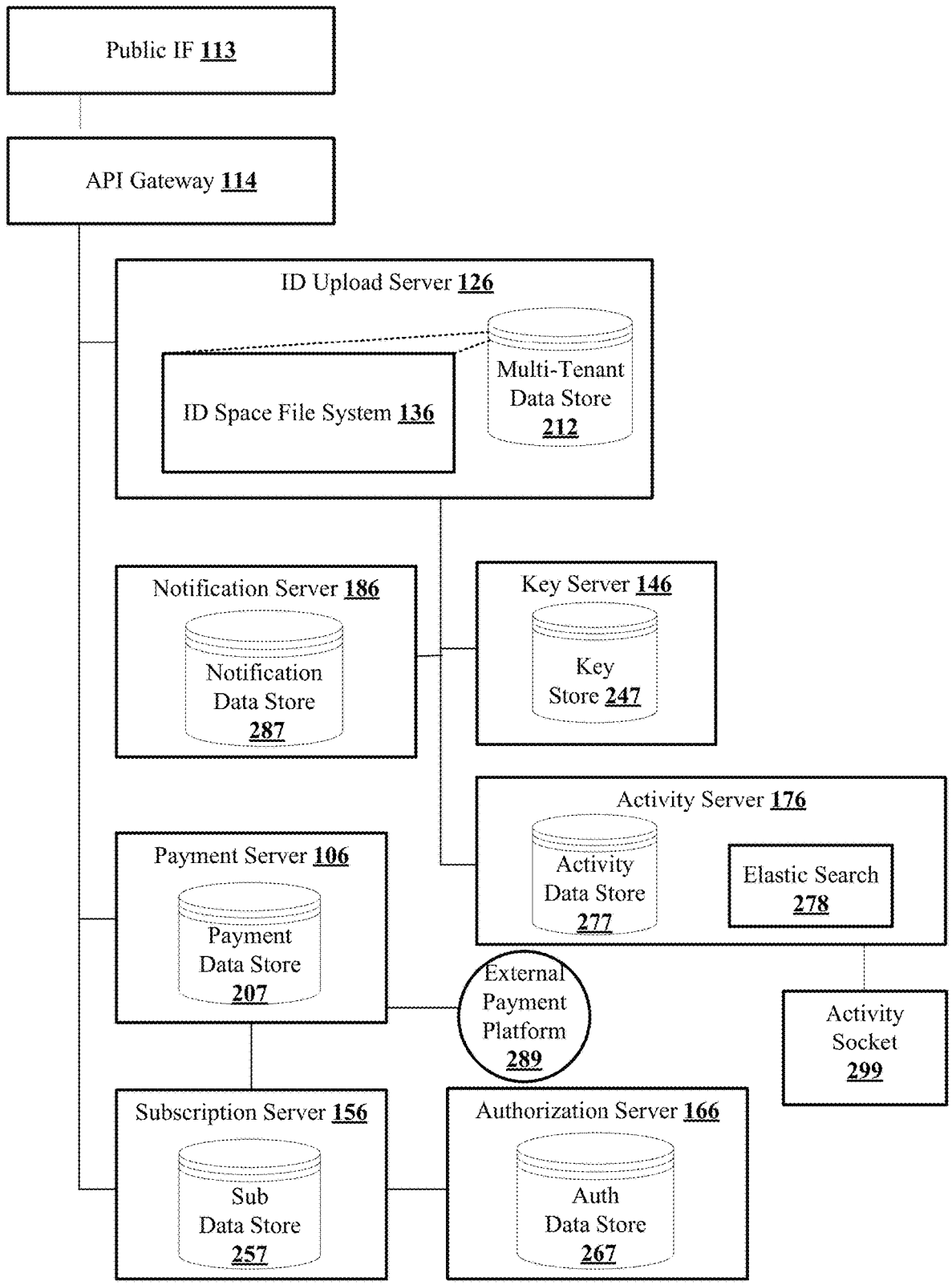
FIG. 2 is a simplified diagram illustrating processes related to public IF 113 in one implementation of validation platform 116.

Now with reference to FIG. 2, a simplified diagram illustrating processes related to public IF 113 in one implementation of validation platform 116, in one example implementation, API gateway 114 provides abstraction and connection of public IF 113 with micro service implementation. An ID upload server 126 is connected with API gateway 114 and includes multi-tenant data storage 212 to implement ID space file system 136. In a present implementation, each document has its own key. Key addresses are saved in a key server related to encrypted documents stored in the filesystem. Keys are stored on the server until the user hits submit, then the document is encrypted with key and key is erased from server and saved external to the document server. Multi-tenant data store 212 is configured to store authentication data across multiple enterprises. File system 136 is not limited to simply authentication data gathered from public user devices 111 via public IF 113, but can include personal data, image data, and customer information, and can be stored in database tables, as relationships and UI elements—including, but not limited to metadata—i.e., data about the data itself Turning our attention to FIG. 3, a simplified diagram illustrating processes related to partner IF 133 in one implementation of validation platform 116, the Multi-tenant data store 212 saves data in encrypted format and is made accessible to authorized users authenticating via the partner IF 133. Noteworthy, however, is that the data is made inaccessible to the public user once gathered and encrypted. After data that is "on-the-move" reaches its intended destination and is stored, it is considered "data at rest" (DAR) when stored in non-volatile memory. Three types of NAND flash used as basic building blocks for non-volatile solid-state memory include multi-level cell (MLC) memory commonly used in USB sticks and SD cards, single-level cell (SLC) memory, and enterprise MLC (eMLC). Encrypted versions of secrets are stored at rest, in multi-tenant data store 212.

Validation platform 116 also includes key server 146 for retrieving encryption keys for encrypting and decrypting files. Key server 146 administers encryption of identification information, captured video streams, captured audio soundtracks and captured still images of users seeking to be authenticated. Keys are generated and stored in key database 247, depicted in FIG. 2 and FIG. 3. In one implementation, the encryption keys are 40 characters alphanumeric along with special characters strings. Data in encrypted format is stored in data store 212, designed to allow retention of critical authentication information like captured video images, still frame images, audio, and the like gathered during authentication of public users. Control over encryption keys is provided by setting encrypted data permissions to protect sensitive data from unauthorized access and isolating key server 146 from unauthorized users' attempts to obtain unauthorized access to secrets, via both browser UIs and mobile applications. Key server 146 is accessible to ID upload server 126 but not via public IF 113, nor partner IF 133, thereby isolating access to authorized processes of ID upload server 126 and managing access for users. While some details of keys server 146 are omitted from FIGS. 2 and 3 for clarity sake, included are a software implemented key generator, encryption and decryption algorithms, such as in virtual environments, for use in parts of the world in which a hardware solution is not available or not workable. In a present implementation encryption keys generated as random string 40 characters. For some implementations, a hardware security module (HSM) that includes a dedicated cryptographic processor that is specifically designed for the protection of encryption keys (secrets) inside a hardened, tamper-resistant device can be implemented.

Geopolitical considerations apply; some countries, such as Australia and some EU countries, restrict trans-border data flow of certain decrypted data, such as personal data, and do not allow secrets that enable decryption of restricted data to leave their country. For those countries, separate certified physical and logical locations implement separate application servers with applications having independent certificates. Separate ID upload servers 126 and ID Space file systems 136 can be provided in each geopolitical jurisdiction that restricts trans-border data flow of the decrypted data for each server. In one implementation, a virtual application server can be implemented with apps with independent certifications.

With renewed reference to FIG. 1 and FIG. 2, environment 100 additionally includes a subscription server 156 communicatively coupled with public IF 113 and an authorization server 166. Further, a payments server 106 is coupled to the public IF 113 and subscription server 156. When a candidate public user attempts to authenticate, typically responsive to being sent a link by a partner user to do so, the subscription server 156 will confirm that the requesting partner user that has sent the link to the candidate user has a current account by checking in a subscription database 257 of FIG. 2. In a present implementation, a customer logs in to the subscription server 156 to buy a subscription for validation services. The payment server 106 will check whether the partner user's account has paid for the authentication request that is now being attempted to be met by checking in a payments database 207 of FIG. 2. In one implementation, payment server 106 communicates with one or more external payment platforms 289 (e.g., Stripe™, Paypal™, Venmo™ or the like) to complete transactions. For example, as illustrated in further detail by FIG. 9B, public user interface 113 submits the payment form data to the payment platform 289, which in turn return a token, then the public user interface 113 sends the token and the payment for data to the API Gateway 114; then the API gateway 114 transfers them to the payment server 106, which in turn creates the subscription on the payment platform 289 and charges the card for the amount needed.

Authorization server 166 provides for controlling access on-demand by administrative users to authentication information such as captured video images, still frame images, audio, and the like gathered during authentication of public users. When a candidate public user attempts to authenticate, the subscription server 156 will, after confirming that the requesting partner user that has sent a link to the candidate user has a current account, will request the authorization server 166 to verify that the requesting partner has authorization to request the authentication by checking in an authorization database 267 of FIG. 2.

Figure 3:
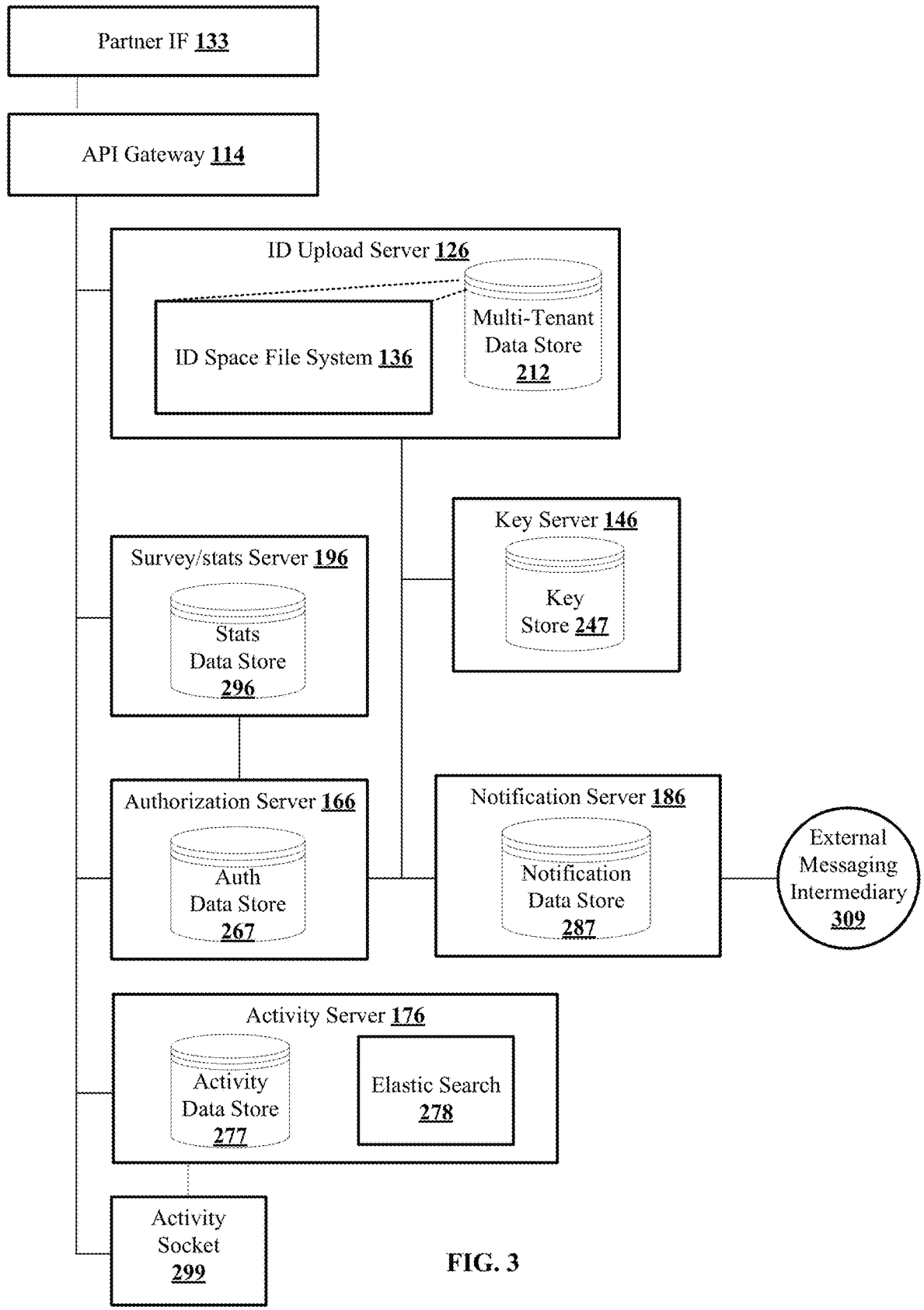
FIG. 3 is a simplified diagram illustrating processes related to partner IF 133 in one implementation of validation platform 116.

Environment 100 additionally includes an activity server 176 communicatively coupled with ID upload Server 126, which logs into an activity data 277 of FIG. 2 actions made by public users and partner/administrative users. Public user's attempts to authenticate are each recorded in the activity server 176. Similarly, as shown in FIG. 3, the actions taken by partner users, such as generating a new authentication request link, sending the link to a public user for authentication, review of public user's authentication materials are each recorded as separate entries in the activity data 277 by the activity server 176. Activity server 176 is further coupled with an elastic search facility ES 278 that enables searching data entries logged in a non-relational format in the activity data 277. An activity socket provides activity data logged to a browser (or other consumer process) in real time or substantially real time. For example, when a first agent reviews a document submitted for a validation, the activity server updates via activity socket the status of the document to the activity data store and reflected in real time as a status update in the browser screen being viewed by a second agent.

Environment 100 additionally includes a notification server 186 communicatively coupled with ID upload server 126, which logs notifications made to public users and partner/administrative users into a notification database 287 of FIGS. 2, 3. In a present implementation, notification server 186 generates emails or other format notifications to users, human and otherwise, processes co-located on platform 116 or other application or service platforms. In one example, notification(s) are generated and sent to a payment system server to trigger charging a payment device (e.g., credit card, smartphone payment service, or wire transfer or others) when a user has been successfully validated by the validation platform 116. In another example, notification(s) are generated and sent to another website to permit the user to access content of the website once the user has been successfully validated by the validation platform 116. As is described below in further detail with reference to FIG. 9A, the notification server 186 sends data to a cloud based messaging intermediary 309 that acts as a proxy between notification server 186 and client users of the validation platform 116. In one implementation Google™ cloud platform implements the cloud based intermediary 309 using web hooks to organize each client user's own notification flow. In an implementation that employs email for sending messages, sendgrid is used as the intermediary 309 in order to send emails. Typical applications include web sites for social media, private clubs, gyms, etc., shopping sites and stores, auction sites, gambling sites, dating sites, user forums, and so forth.

Environment 100 additionally includes a survey and statistics server 196 communicatively coupled with ID upload Server 126, which logs into a statistics database 296 of FIG. 3 statistics on usage, authorization attempts validated, authorization attempts that failed validation, and others. Statistics are made available to partner/administrative users. Statistics may be gathered for number of validation attempts involved fraudulent activities, number of validations for users of a particular partner or client of the validation service operating the platform, parts of the world from which attempts to validate are received and so forth.

Public user computing devices 111 and partner user devices 191, are also included in environment 100. Partner user computing devices 191 provide an interface for users at partnering or customer firms that have established a relationship with the provider of validation platform 116 to administer authentication by public users at public user computing devices 111 using the functionality of validation platform 116. Partner users (also called authorized representatives or administrative users) can create authorization requests from a dynamically configurable set of pieces of identification, send a link to a candidate member of the public users to initiate authentication with validation platform 116 using the authorization request created. Partner users can be further provided with access functions enabling partner users to review the images captured of the candidate public user seeking to be authenticated, including accessory photos and/or video clips taken (also referred to as the "Timeline"). The use of the Timeline allows an authorized representative to determine whether the picture identification provided by the candidate user is actual or fraudulent. The timeline can capture details surrounding the authentication process, such as whether the candidate user is using a cell-phone, monitor, or still photograph to present a picture to the public user computer device 111 instead of presenting their own face to the device's camera. In some implementations, a zoom lens tool is triggered on the administrative user's partner user device 191 to allow a close-up inspection of details of the candidate's images. In some implementations, Public user computing devices 111 and partner user devices 191 can be a personal computer, laptop computer, tablet computer, smartphone, personal digital assistant (PDA), digital image capture devices, and the like.

In some implementations, the modules of environment 100 can be of varying types including workstations, servers, computing clusters, blade servers, server farms, or any other data processing systems or computing devices. Modules can be communicatively coupled to the data store via a different network connection. For example, validation platform 116 can be coupled via the network 152 (e.g., the Internet) with Public user computing devices 111 and partner user devices 191. ID space file system 136 coupled to a direct network link, and can additionally be coupled via a direct link to multi-tenant data store 212. In some implementations, public user computing devices 111 and partner user devices 191 may be connected via a WiFi hotspot.

In some implementations, network(s) 152 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, or other appropriate configuration of data networks, including the Internet.

In some implementations, data stores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

The technology disclosed can be implemented in the context of many computer-implemented systems including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

To ensure that customers have a secure connection from their browsers to the enterprise service, an enterprise platform uses global certificates, connecting via transport layer security (TLS) cryptographic protocols. Individual user sessions are identified and re-verified with each transaction, using a unique token created at login to access the secure backend system.

In many implementations, environment 100 may not have the same elements as those listed above and/or may have other/different elements instead of, or in addition to, those listed above.

An application programming interface (API) can provide an interface for developers and programmers to access the underlying capabilities and features of validation platform 116. The technology disclosed is compatible with different types of APIs, including web service APIs such as HTTP or HTTPs based APIs like SOAP, Bulk, XML-RPC and JSON-RPC and REST APIs (e.g., Flickr™, Google Static Maps™, Google Geolocation™), web socket APIs, library-based APIs like JavaScript and TWAIN (e.g., Google Maps™ JavaScript API, Dropbox™ JavaScript Data store API, Twilio™ APIs, Oracle Call Interface (OCI)), class-based APIs (objet orientation) like Java API and Android API (e.g., Google Maps™ Android API, MSDN Class Library for .NET Framework, Twilio™APIs for Java and C #), OS functions and routines like access to file system and access to user interface, object remoting APIs like CORBA and .NET Remoting and hardware APIs like video acceleration, hard disk drives, and PCI buses. Other examples of APIs used by the technology disclosed include Amazon EC2 API™, Box Content API™, Microsoft Graph™, Dropbox API™, Dropbox API v2™, Dropbox Core API™, Dropbox Core API v2™, Facebook Graph API™, Foursquare API™, Geonames API™, Force.com API™, Force.com Metadata API™, Apex API™, Visualforce API™, Force.com Enterprise WSDL™, Salesforce.com Streaming API™, Salesforce.com Tooling API™, Google Drive API™, Drive REST API™, AccuWeather API™, aggregated-single API like CloudRail™ API, and others.

Figure 4:
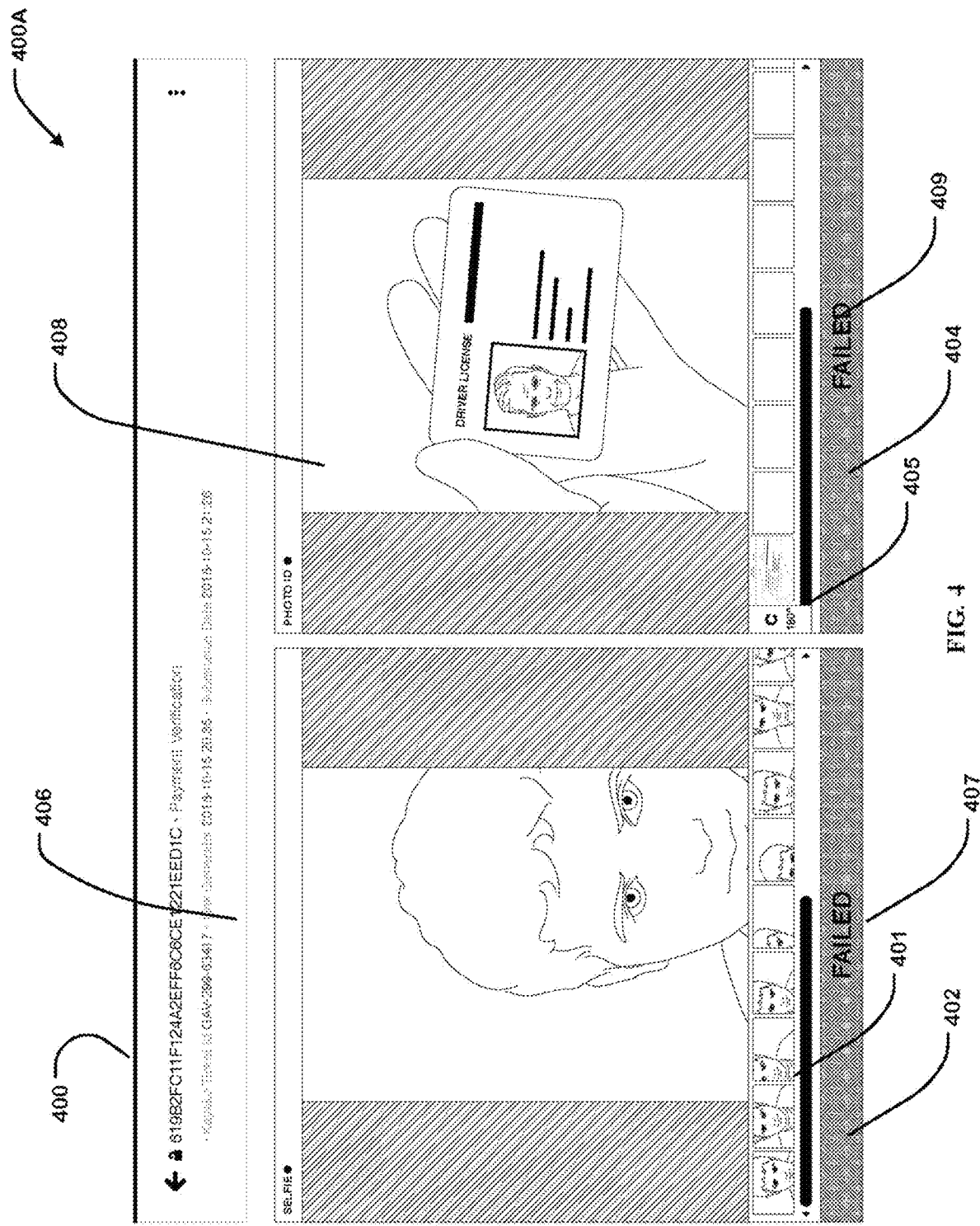
FIG. 4 illustrates use of one implementation having a settable zoom so that the device camera captures fraudulent activity in the margins.

FIG. 4 illustrates use of one implementation 400A having a settable zoom so that the device camera captures fraudulent activity in the margins. Here, a partner user (not shown) has used her computing device 191 to access a validation record 400 stored by the ID upload server 126 in filesystem 136 after having herself first authenticated with the validation platform 116. The partner UI 133 reveals to the partner user a selfie block 402, in which the public user seeking to authenticate has captured a selfie 406 with his device 111 camera. Here, validation platform 116 has captured some suspicious activity; the validation attempt for the selfie block 402 has been marked a fail 407 because the selfie 406 is not the same person as is pictured on the photo ID 408. Further, the partner UI 133 displays a video clip 401 showing the activity of the public user prior to taking the selfie.

As seen on the right hand side of FIG. 4, the partner UI 133 displays a photo ID block 404 having a captured still image of a photo ID 408 and a video clip 405 of validation record 400 captured by the public user's device and stored in filesystem 136. Here again, validation platform 116 has captured some suspicious activity; because the device's camera zoom has been set by instructions from the ID upload server 126 to capture more of the field of view than what is shown to the user seeking to be authenticated, the user's use of a picture of someone else's ID on his smartphone, and presented his smartphone to the device camera, has been captured by the device camera, stored in the validation record 400 and revealed by the still image of user's photo ID 408 and video clip 405. Accordingly, the validation attempt has been marked a fail 409.

While the decision to deem a particular validation attempt as failed/fraudulent is ultimately the responsibility of the partner user, one implementation of validation platform 116 applies machine learning to the images to automatically detect possible smartphone presence or to detect other indicators of potential fraud. When detected, the validation platform 116 can raise a warning, or trigger some other kind of indicator to inform the partner user that fraud is suspected. Multi-layered convolutional neural networks (CNN) can implement a trainable classifier that when applied to recognizing images can detect the presence of indicators of potential fraud. A dataset of images including indicators of potential fraud and images in which such indicators are absent can be used to train the CNN. When discovered, such indicators of potential fraud can be suggested to the user in the form of alerts, used to trigger warnings, used to trigger defensive measures against a potential fraudster, combinations thereof and/or to initiate other actions.

Figure 5A:
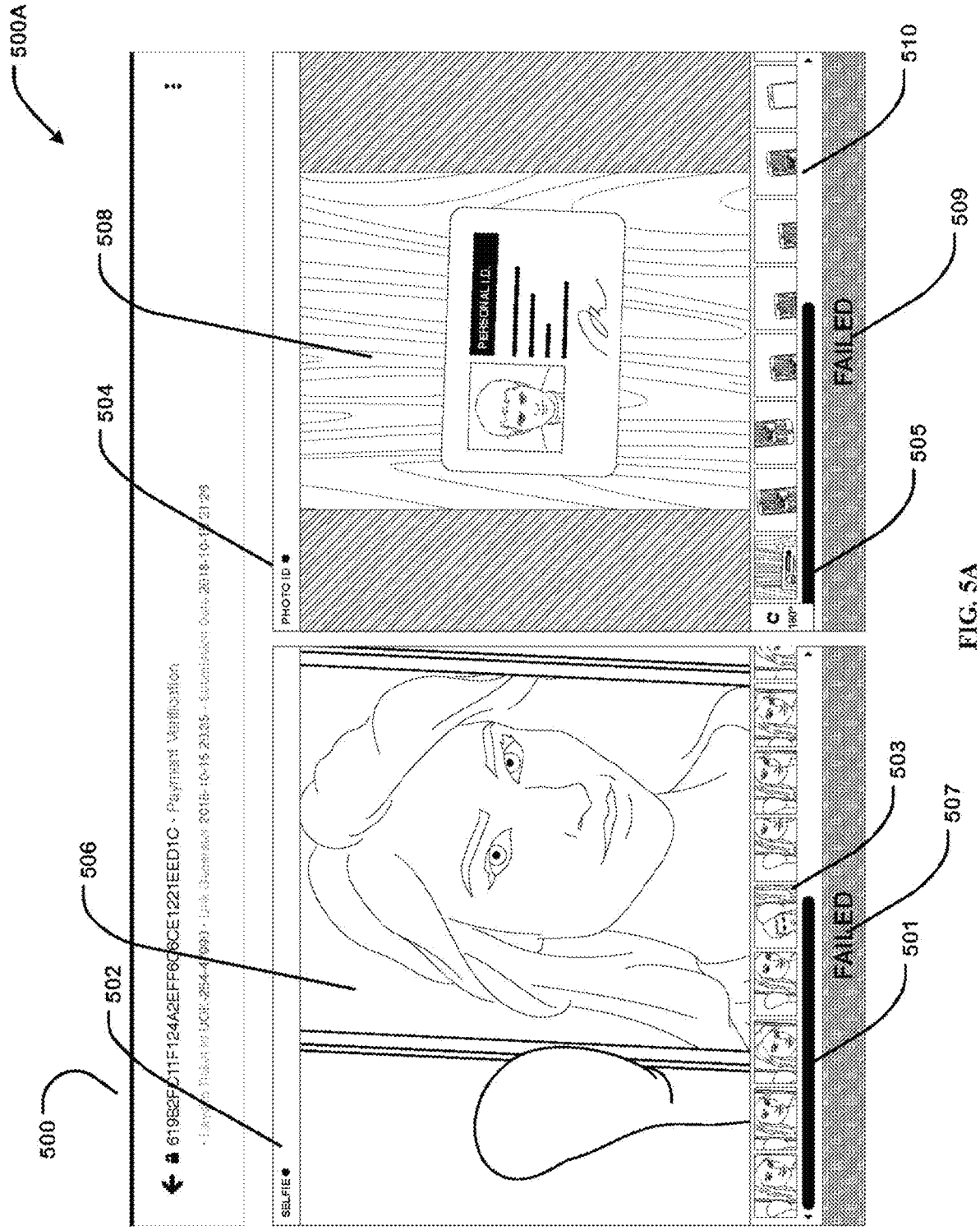
FIGS. 5A, 5B, 5C and 5D illustrate capturing fraudulent activity using video triggered before capturing a still photograph in one implementation.

FIGS. 5A, 5B, 5C and 5D illustrate other examples of capturing fraudulent activity using video triggered before capturing a still photograph in one implementation. In FIG. 5A, an example 500A is showing partner UI 133 displaying a validation record 500 stored by the ID upload server 126 in filesystem 136 for another authentication attempt by a public user, apparently female, seeking authentication whose selfie and photo ID have been captured with her device's camera. Validation record 500 includes a selfie block 502, comprising a snapshot image 506 and a video clip 501 of the activity of the public user in the moments immediately prior to the public user activating the control on her device to capture her selfie and a photo ID block 504 comprising a snapshot image 508 of a photo ID and a video clip 505 of the activity of the public user in the moments immediately prior to the public user activating the control on her device to capture a picture of her photo ID. In a present implementation, up to 20 image frames can be captured. Additional images can be captured but will overwrite the oldest images. In a present implementation, a plurality of images can be captured during a second. Other capture rates and/or buffer capacities may be used.

With reference to the left hand side of FIG. 5A, validation platform 116 has captured some suspicious activity in video 501; because the device's camera has been activated by instructions from the ID upload server 126 to capture video 501 prior to the selection of the control to capture a selfie, the public user's use of a picture of someone else's face displayed on a smartphone held up to the camera of the user device has been captured by the device camera in image frame 503 as part of video 501, and is stored with the validation record 500. Accordingly, the validation attempt for the selfie block 502 has been marked a fail 507.

With continuing reference to FIG. 5A, validation platform 116 has captured some suspicious activity on the right hand side of FIG. 5A as well. The partner UI 133 displays a photo ID block 504 including a captured still image 508 of the user's photo ID and a video clip 505 of the activity of the public user in the moments immediately prior to the public user activating the control on her device to capture a picture of her photo ID. Because the device's camera has been activated by instructions from the ID upload server 126 to capture video 505 prior to the selection of the control to capture a picture of the user's photo ID, the user's use of a picture of someone else's photo ID on a smartphone 510 has been captured by the device camera in video 505, and stored with the validation record 500. Accordingly, the validation attempt for the photo ID block 504 has been marked a fail 509.

Figure 5B:
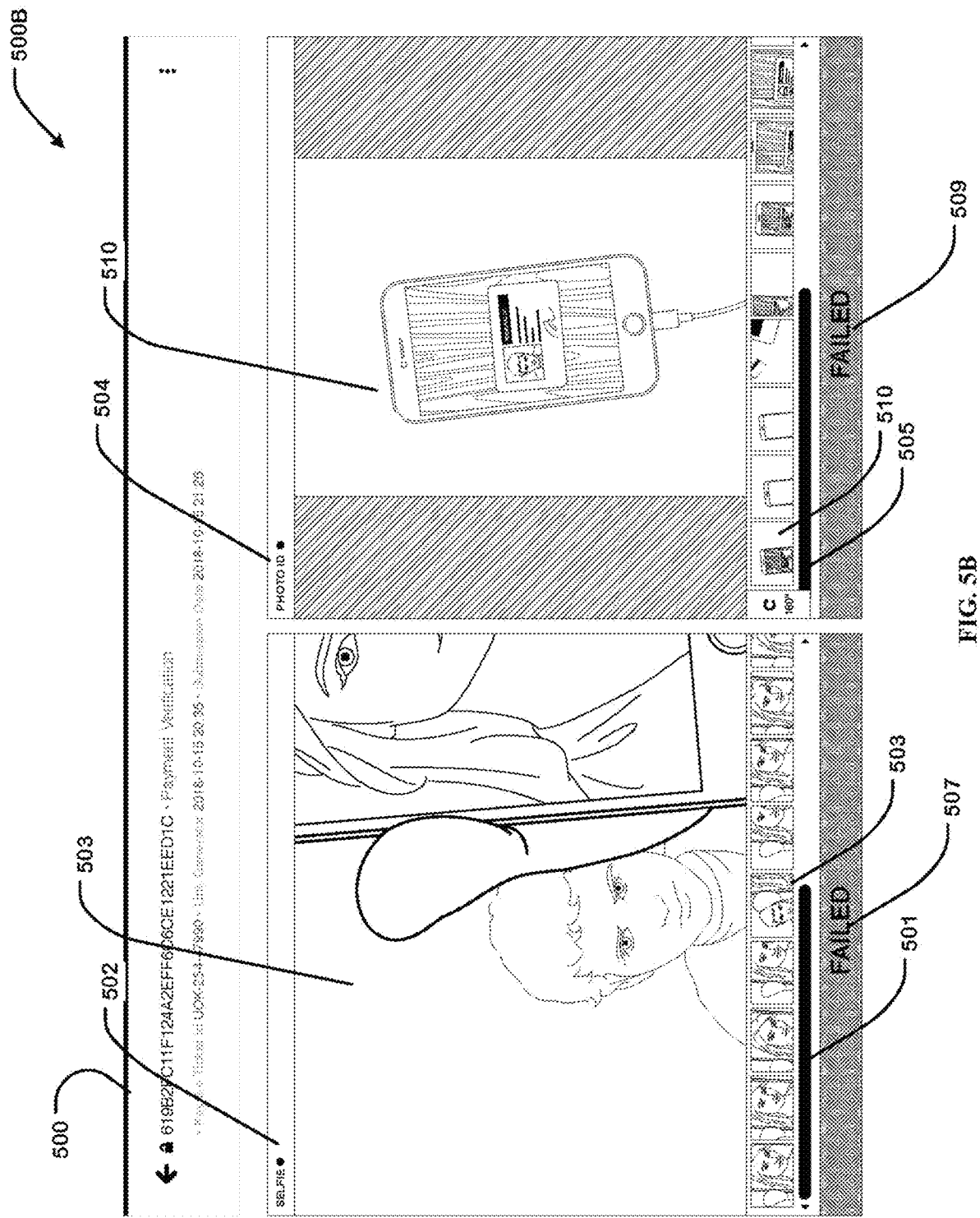

FIG. 5B illustrates another view 500B of information stored with validation record 500 presented by partner UI 133. In FIG. 5B, a partner user has scrolled video clip 501 on the left hand side in order to select and display image frame 503 in the selfie block of the partner UI 133. Image frame 503 reveals an image capturing a fraudster holding his smartphone up to the device camera, feigning to be the female public user seeking authentication. Now with reference to the right hand side of FIG. 5B, the partner user has scrolled video clip 505 in order to select and display image frame 510 in the photo ID block of the partner UI 133, revealing the photo ID presented by the fraudster to the device camera is actually a picture of someone's ID stored on a smartphone. By scrolling video clips 501, 505, the partner user is able to look closely as suspicious frames to identify the fraudulent activity.

Figure 5C:
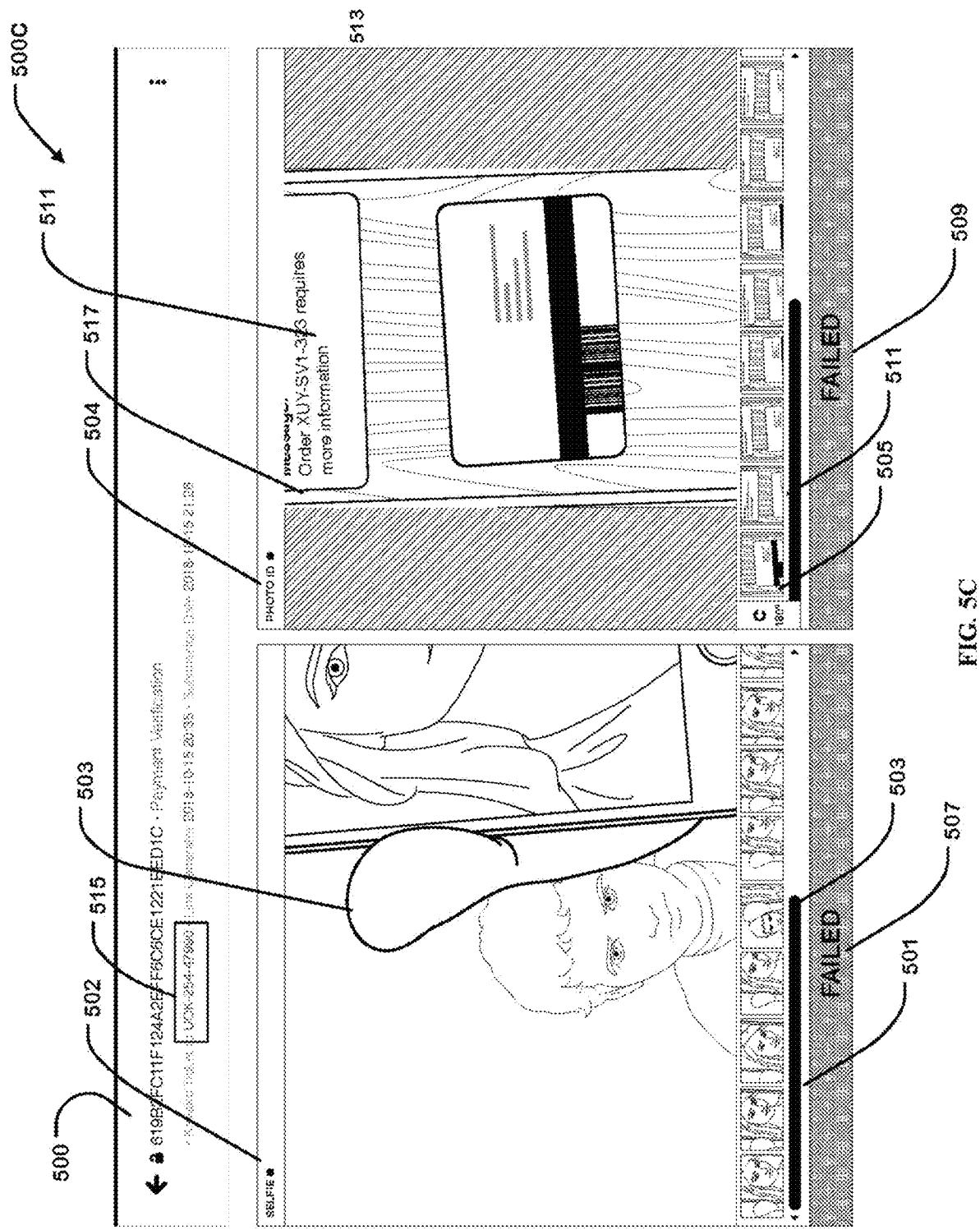

Now with reference to FIG. 5C, a still further view 500C of the information stored with validation record 500 is shown. On the right hand side, the partner user has continued scrolling video 505 to reveal image frame 511 and selected it, causing partner UI 133 to display image frame 511 in the photo ID block 504 thereby enabling the partner user to view it more readily in an expanded version of it. Image frame 511 reveals a support ticket 513 from public IF 113 of the validation platform 116. Further, the support ticket 513 has an identifier 517 (XUY-SV1-323) that is different from the identifier 515 (UOK-254-47990) assigned to validation record 500. The two identifiers corresponding to two previously unconnected validation requests, indicates that the same person is making both requests.

Figure 5D:
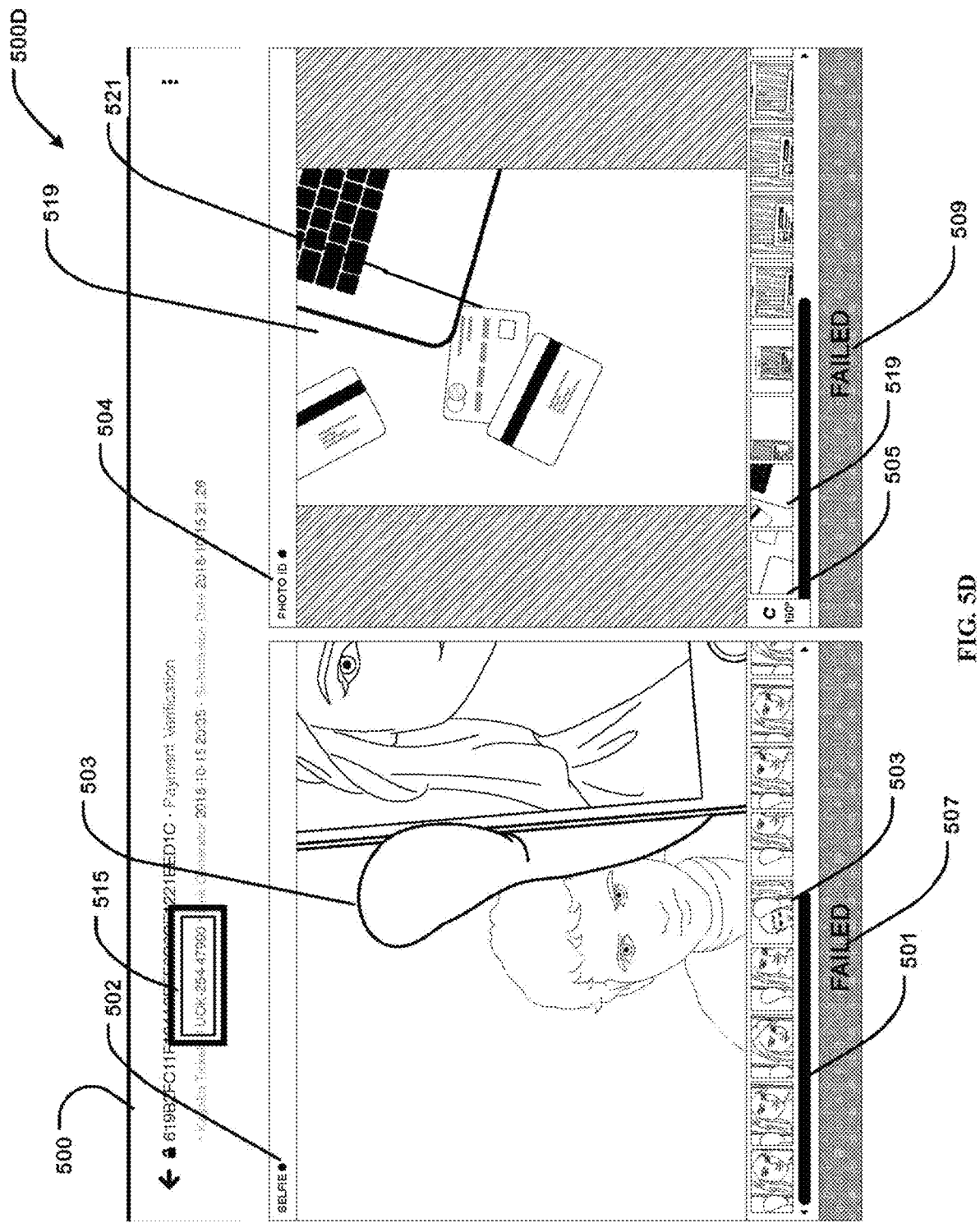

Now with reference to FIG. 5D, a yet further view 500D of the information stored with validation record 500 is depicted. On the right hand side, the partner user has continued scrolling video 505 to reveal image frame 519 and selected it, causing partner UI 133 to display image frame 519 in the photo ID block 504. Image frame 519 reveals what appears to be a plurality of IDs and a credit card 521 that has also been captured by the user device camera. The significance of credit card 521 will become apparent in the discussion below with reference to FIG. 6C.

Figure 6B:
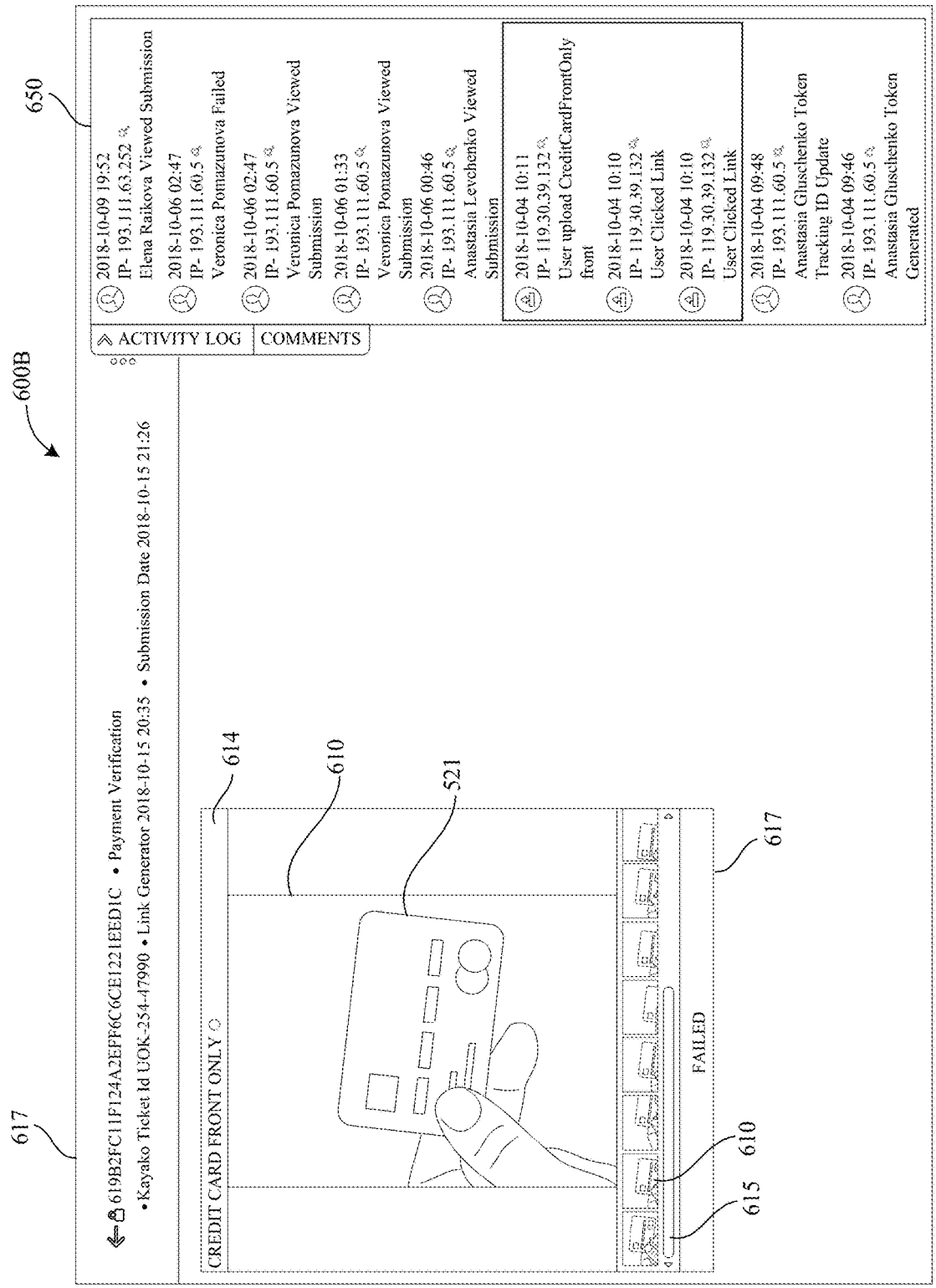
Figure 6C:
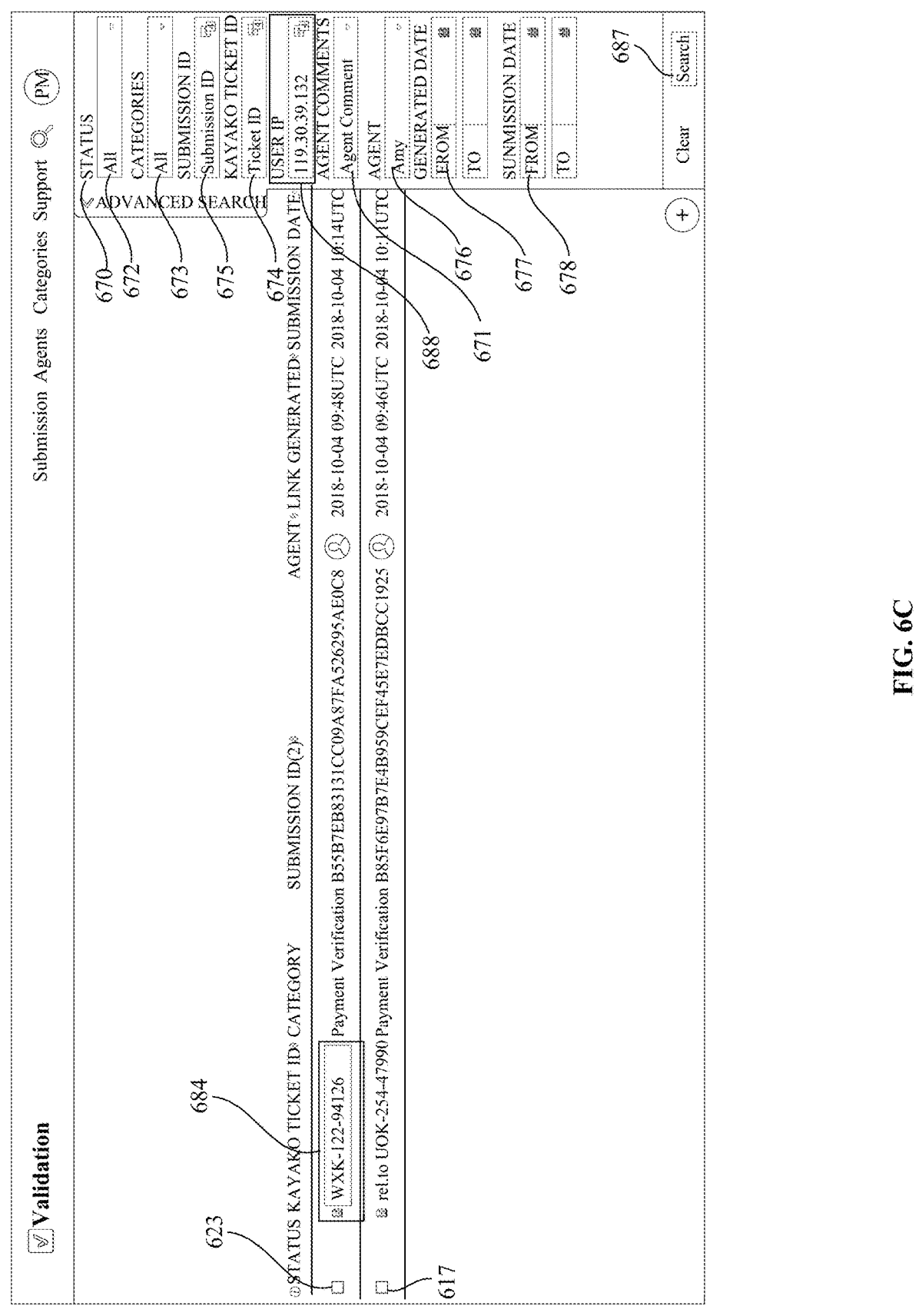

FIGS. 6A, 6B and 6C illustrate various panels 600A, 600B, 600C of a user interface and demonstrates finding other fraudulent activities related to a known fraudulent activity in one implementation. In FIG. 6A, the partner UI 133 displays a UI panel 600A having entries for various validation records 500, 617, 619, and 621, corresponding to different authentication requests, stored by the ID upload server 126 in filesystem 136. Validation platform 116 displays panel 600A responsive to an input request by partner user that is received via the partner user UI 133. Here, the partner user has marked a ticket ID entry for record 617 in ticket ID column 604 with an indication that the record is related to ticket ID of validation record 500, immediately above it in panel 600A. Validation platform 116 receives this marking via partner UI 133 and updates file system 136 to reflect the association between these two authorization attempts. Activity server 166 further updates activity data store 267, which is reflected in activity log 650 in FIG. 6B. Additional validation records 619, 621 are also found to match the ticket ID in column 604. As shown by entries in agent column 606, these validation records were tagged by different agents. Upload server 126 has searched the file data store 212 and file system 136 for validation records with ticket IDs matching validation record 500, found validation records 619, 621 and provided them in display panel 600A. As revealed by status column 602, each one of validation records 500, 617, 619, 621 have been marked as failing.

Panel 600A optionally includes display of a category 603 of the transaction for which validation is sought and a unique identifier 605 for each validation request. Some implementations of panel 600A further include display of a link generated 607 date and time, submission 608 date and time and a reviewed 609 date and time.

In FIG. 6B, the partner UI 133 displays a UI panel 600B comprising information for validation record 617 of FIG. 6A. On the left hand side, the partner user has scrolled video 615 to reveal image frame 610 and selected it, causing partner UI 133 to display image frame 610 in a credit card front photo block 614 thereby enabling the partner user to view it more readily in an expanded version of it. Image frame 610 reveals a close up image of credit card 521, the identical credit card captured by the device camera during validation attempt in validation record 500 in image frame 519 of FIG. 5D. Accordingly, in this example, validation platform 116 has enabled the partner user or agent to discover a common item to two different authentication requests, providing a strong link between these two different authentication requests. Further, because one of the two different authentication requests is fraudulent, the validation platform 116 has enabled the user agent to detect a chain of criminal activity.

Now with reference to FIG. 6C, the partner UI 133 displays a UI panel 600C having entries for validation record 617 and a newly revealed validation record 623 having a different identifier 684 (wxk 122-941126) that has been discovered to be related to validation record 617. Using search facility 670, input of a user IP address 688 of validation record 617 and selecting search key 687, triggers a search of data base 212 to obtain all other entries having an analogous user IP address. The search result, comprising entries for validation records 617, 623, is displayed by partner UI 133 in panel 600C. While search facility 670 is illustrated in this example by searching user IP address 688, other fields in the schema of data base 212 can be used, including without limitation, ticket identifier 674, category 673, submission identifier 675, agent comments 671, agent 676, generated 677 date and time, submission 678 date and time and/or others not illustrated by FIG. 6C for brevity's sake.

Figure 7:
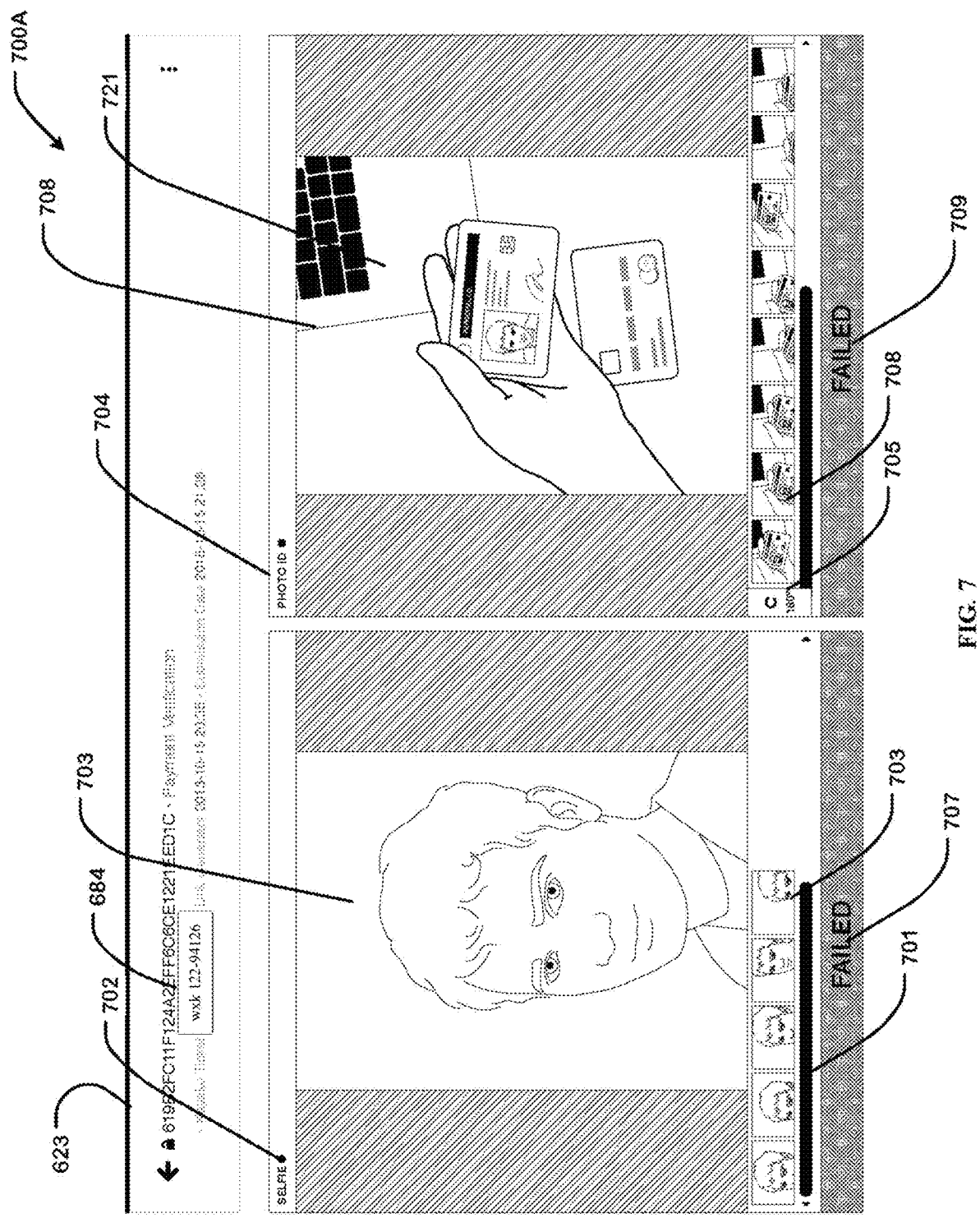
FIG. 7 illustrates a partner user or agent using partner UI 133 to retrieve evidence identifying a fraudster perpetrating the series of criminal acts from new validation record 623.

Now with reference to FIG. 7, panel 700A illustrates our partner user or agent has used partner UI 133 to retrieve evidence identifying a fraudster perpetrating the series of criminal acts from new validation record 623, the existence of which was revealed in a search conducted on data store 212 as illustrated above with reference to FIG. 6C. In FIG. 7, the partner UI 133 reveals to the partner user that validation record 623 includes a selfie block 702, in which the public user seeking to authenticate has captured an image frame 703 that includes a selfie with his device camera. Further, the partner UI 133 displays a video clip 701 showing the activity of the public user prior to taking the selfie. Also shown by the partner UI 133 is the identifier 684 (wxk 122-94126) revealed by the search conducted using the search facility 670.

Because the individual captured by the validation attempt for the selfie block 702 is the identified as strikingly similar or the same person as the person presenting 503 a smartphone image to a device camera in another validation attempt illustrated by FIG. 5B, the selfie block for this validation record 623 has been marked a fail 707.

Now with reference to the right hand side of FIG. 7, validation platform 116 has captured some evidence of suspicious activity, as well as evidence revealing the identity of the fraudster. In FIG. 7, the partner UI 133 displays a photo ID block 704 having a captured image frame of a photo ID 708 and a video clip 705 of validation record 623 captured by the public user's device and stored in filesystem 136. Image frame 708 appears to have captured a credit card that appears suspiciously similar to, or perhaps identical to, credit card 521 in FIG. 5D and FIG. 6B. Yet further, it appears that the fraudster has actually presented his own real ID 721 to the device camera when seeking to authenticate himself and his real ID 721 has been captured by validation platform 116 and presented in image frame 708. Accordingly, using the functionality of the validation platform 116, the partner user has been able to link together seemingly independent fraudulent acts and traced them back to a single fraudster. Moreover, the partner user has been able to identify the fraudster from his own real ID 721 presented during one of this authorization attempts.

Figure 8:
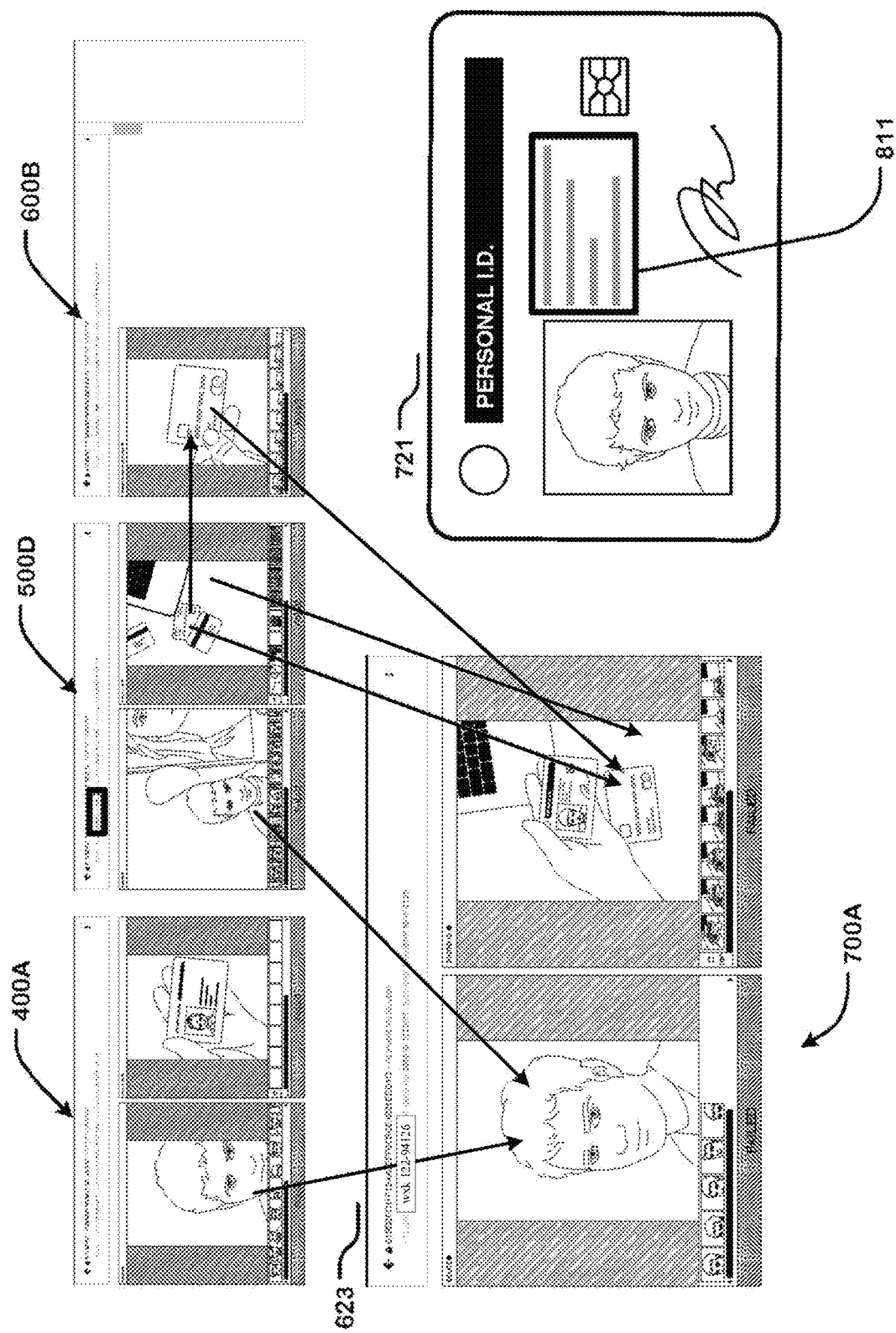
FIG. 8 illustrates validation platform 116 being used to build a case against a fraudster from a series of fraudulent authorization attempts in one implementation.

FIG. 8 illustrates validation platform 116 being used to build a case against a fraudster from a series of fraudulent authorization attempts in one implementation. Using the functionality of validation platform 116, a partner user or agent is able to gather evidence linking together a train of suspicious authorization attempts, and can ultimately trace them back to a single authorization record that identifies the fraudster. As show by FIG. 8, validation record 623 of UI panel 700A shown in FIG. 7 depicts a selfie photo 703 of the fraudster, which is highly similar to the individual captured in selfie photo of an individual showing a smartphone photo 408 of someone else's photo ID to their user device in UI panel 400A shown in FIG. 4. Yet further, the same individual appears to be seeking authorization using a smartphone to present a "selfie" picture 503 of a woman in UI panels 500A, 500B, 500C, and 500D shown in FIGS. 5A-5D. Still further, a number of image frames in UI panels 500D, 600B captured a common credit card 521 that additionally appears in UI panel 700A shown in FIG. 7. Still yet further, UI panel 700A includes common elements in the environment captured by the device camera under control of validation platform 116, including the same table cloth and laptop. Finally, FIG. 8 further illustrates that the fraudster's real ID 721 is used to discover the name 811 and address of the fraudster behind the fraudulent authorization attempts.

Figure 9A:
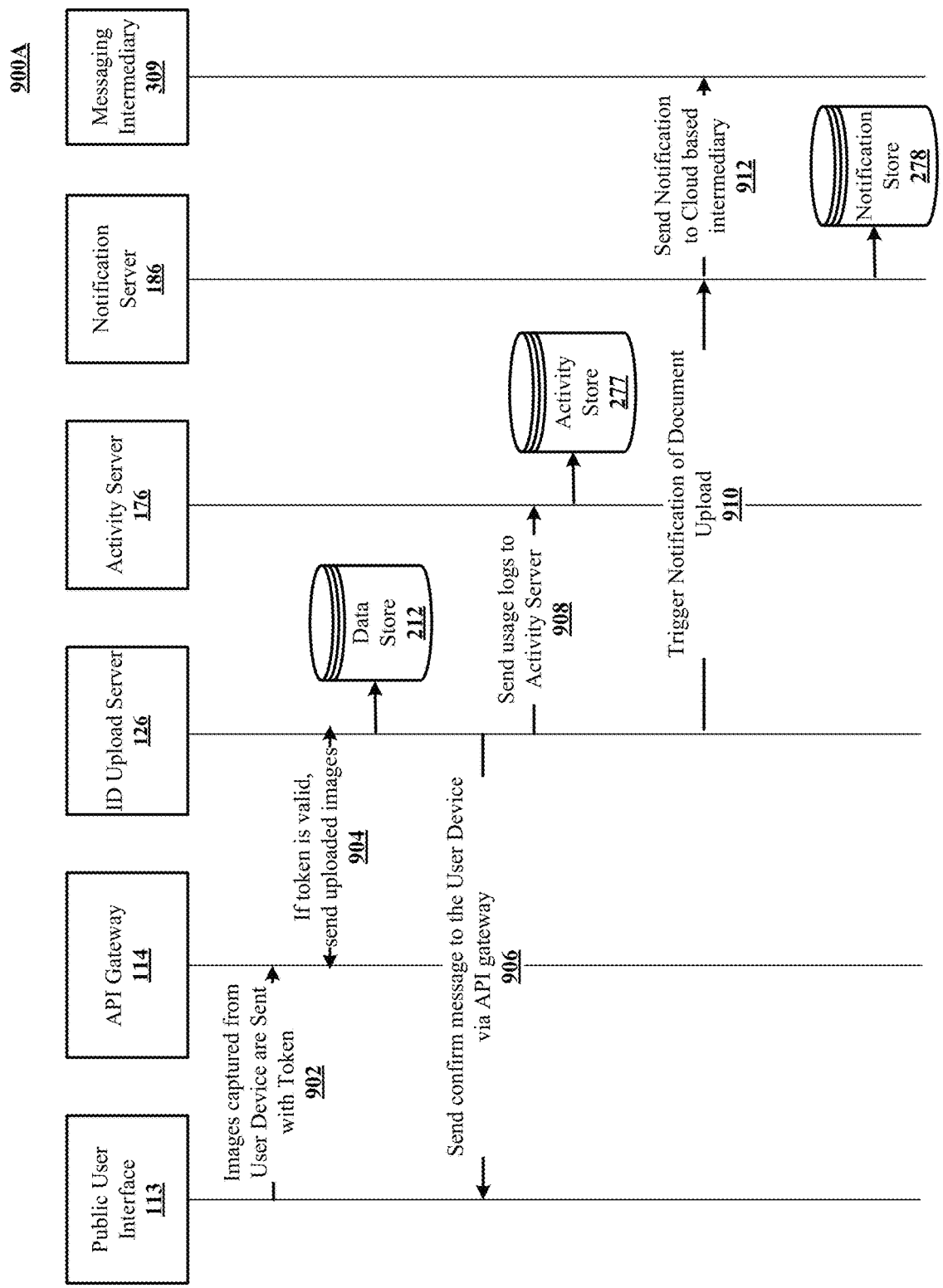
FIG. 9A exemplifies verification initiated data flows for a user under verification.

FIG. 9A exemplifies verification initiated data flows 900A for a user under verification. As shown in FIG. 9A, a user being verified is interacting via a public user interface 113 in communication with an API gateway 114 that acts as an abstraction layer that routes requests within the validation platform 116, and sends the requests to the respective micro-services, thereby enabling micro-services to be protected from public disclosure. Images captured from a user device are sent by the public user interface 113 to the API gateway 114 with a token in 902. The API gateway 114 queries ID upload Server 126 if the token (received from the public user interface 113) is valid and what documents are required for this token. Once the token's validity is confirmed, the API gateway 114 sends a message to ID upload server 126 and includes the uploaded images 904. The ID upload server 126 saves the images, encrypts them using the keys and deletes the keys. The keys will be stored in keys server instead, and will be requested by ID upload server 126 when someone wants to access (decrypt) the images. ID upload server 126 already has the encryption keys by this time because the keys are generated on creation of the link sent to the user inviting the user to validate. Once the user's photos and/or other documents are finished uploading from the user device, the keys are deleted from ID upload server, however a copy of the key remains stored by the keys server 146 in key store 247.

Continuing with the description of FIG. 9A, the ID upload server 126 sends a confirmation to the public user interface 113 through the API gateway 114 in 906. The ID upload server 126 sends the usage logs to activity server 176 for storage in the activity store 277 in 908. The ID upload server 126 contacts the notification server 186 to send out notification(s) about the uploaded document set 910. Notification can be in the form of an email or other implementations.

Again with reference to FIG. 9A, the notification server 186 sends data to a cloud based messaging intermediary 309 that acts as a proxy between notification server 186 and client users of the validation platform 116 in 912. In one implementation Google™ cloud platform implements the cloud based intermediary 309 using web hooks to organize each client user's own notification flow 912. In an implementation that employs email for sending messages, sendgrid is used as the intermediary 309 in order to send emails, thereby enabling better delivery and avoiding revealing to the public technical or identity information for the servers of the validation platform 116.

Notifications may be stored in the notification store 278. Having described use of the validation platform from the point of view of a user seeking to authenticate, the discussion now turns to the point of view of a public user subscribing to validation services.

Figure 9B:
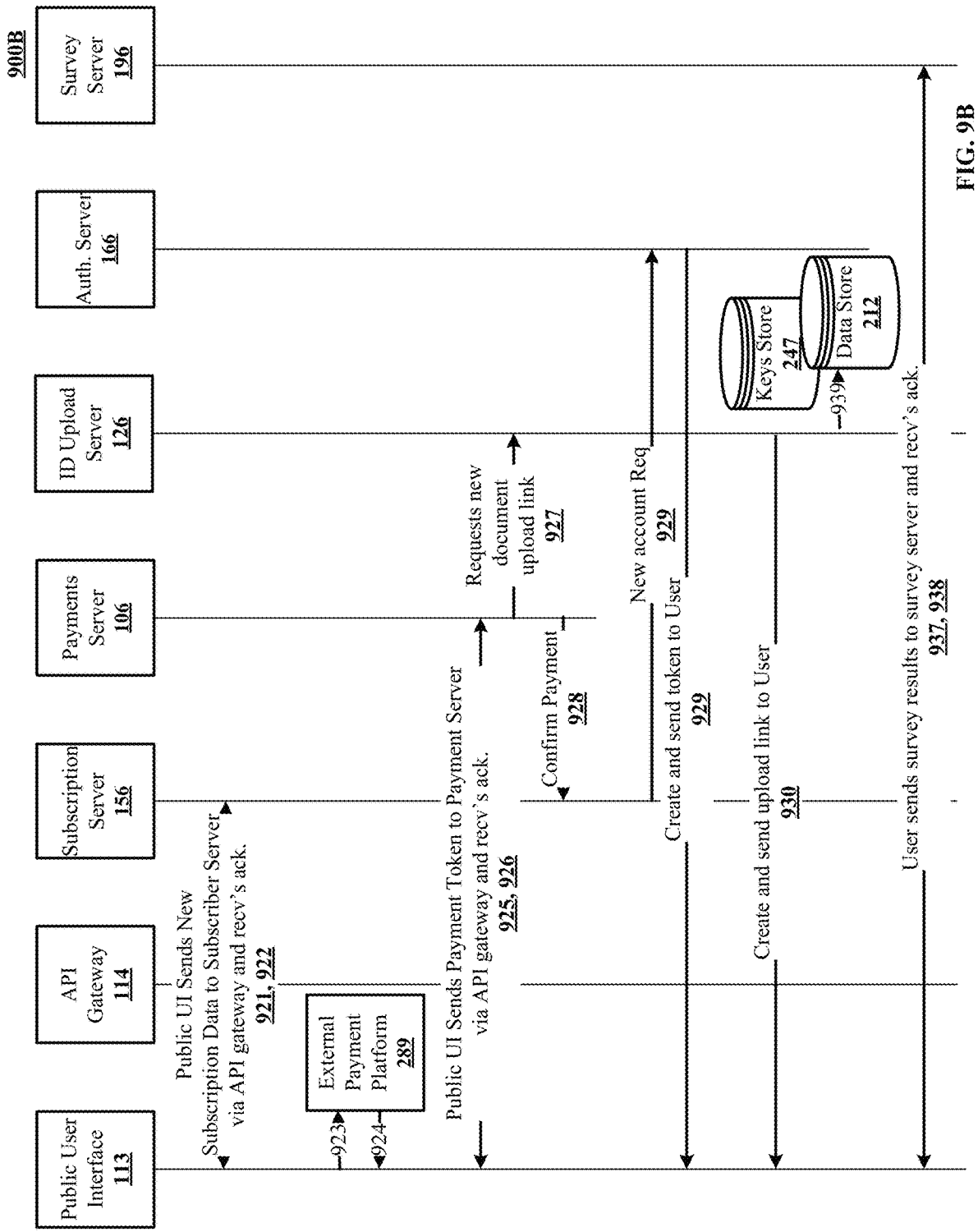
FIG. 9B exemplifies public user initiated data flows for a user obtaining a subscription to perform verification.

FIG. 9B exemplifies public user initiated data flows 900B for a user obtaining a subscription to perform verification. As shown in FIG. 9B, a public user desiring to obtain subscription to verification services to verify the user's clients, customers, transaction partners, users, or the like, is interacting via a public user interface 113 in communication with an API gateway 114 that acts as an abstraction layer that routes requests within the validation platform 116, and sends the requests to the respective micro-services, thereby enabling micro-services to be protected from public disclosure.

The data about the new subscription sent by the public user interface 113 is routed via the API gateway 114 to the to the subscription server 156 in 921. The subscription server 156 sends a confirmation the public user interface 113 indicating that the subscription information submitted has been received in 922.

The public user interface 113 will submit a payment to an external payment platform 289 (e.g., Stripe™, Paypal™, Venmo™ or the like) in 923 and receives a payment token in return 924. In a present implementation, public user interface 113 submits the payment form data to the payment platform 289, which in turn return a token, then the public user interface 113 sends the token and the payment for data to the API Gateway 114; then the API gateway 114 transfers them to the payment server 106, which in turn creates the subscription on the payment platform 289 and charges the card for the amount needed. Once this is successful, payments server 106 contacts ID upload server 126 and generates a link for the user to submit his ID in case of success. The payments server 106 contacts subscription server 156 to tell it that the payment was successful or not, in case of success the subscription server 156 contacts the authorization server 166 to create the account for this new subscription. When all this is done, the link for documents submission is returned to the public user interface 113 for the user to be able to provide his documents.

Public user interface 113 passes the payment token from the external payment platform 289 and payment data to the payments server 156 once the subscribing user has paid in 925. The payments server 106 sends a confirmation of the payment to the public user interface 113 in 926.

The payment server 106 sends a request to create a document upload link to the ID upload server 126 in 927.

The payment server 106 contacts the subscription server 156 with a confirmation of payment 928.

The subscription server 156 sends a request to create a new account to the authorization server 166 in 929. Authorization server 166 creates the partner account (admin account), new category and a role. Then, creates the member using the data pulled from the first data flow 921 of the subscription. Authorization server 166 gives the member a token for ID upload server 126 to upload the data.

The ID upload server 126 creates and sends the upload link to the public user interface 113 through the API gateway 114 in 930. When the link is generated, the ID upload server 126 creates the keys and saves them in the data store 212 and key store 247 databases 939.

A user to be validated receives the link via the public user interface 113, clicks the link and commences validation processing with validation actions 902-912 discussed above with reference to FIG. 9A.

Public user interface 113 passes the survey results to survey server 196 and receives a confirmation back 937, 938.

Having described use of the validation platform from the point of view of a public user subscribing to validation services, the discussion now turns to the point of view of an Admin's or Agent's use of the partner user interface 133 to access and use the features of the validation platform 116.

Figure 9C:
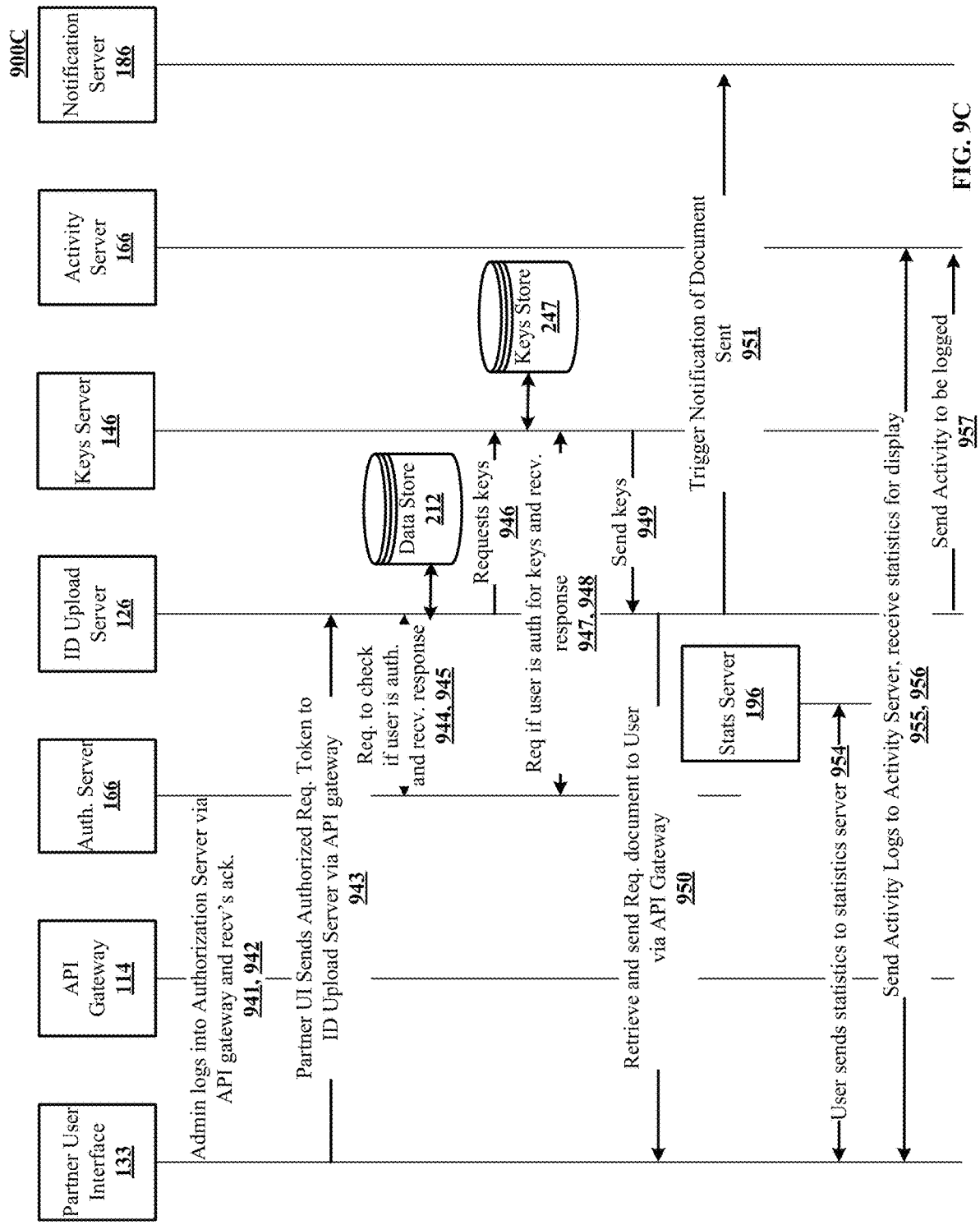
FIG. 9C exemplifies partner user initiated data flows for an administrative user or authorized agent or representative's review of validation submissions for detecting fraudulent activity.

FIG. 9C exemplifies partner user initiated data flows 900C for an administrative user or authorized agent or representative's review of validation submissions for detecting fraudulent activity. As shown in FIG. 9C, an administrative user or agent desiring to review verification submissions to verify the user's clients, customers, transaction partners, users, or the like, is interacting via a partner user interface 133 in communication with an API gateway 114 that acts as an abstraction layer that routes requests within the validation platform 116, and sends the requests to the respective micro-services, thereby enabling micro-services to be protected from public disclosure.

The administrative user or agent uses the partner user interface 133 to log in using the authorization server 166, passing in the administrative user's login credentials 941 via API gateway 114. In one implementation, two factor authentication is employed during the log in process conducted by the authorization server 166. The authorization server 166 authorizes the administrative user or authorized agent and sends confirmation back using the partner user interface 133 in 942.

The partner user interface 133 passes the authorized request token to the ID upload server 126 in 943 the partner user interface 133 in 942.

The ID upload server 126 contacts the authorization server 166 to verify the authorization of the request 944. The authorization server 166 returns the response to the ID upload server 126 in 945.

The ID upload server 126 contacts the keys server 146 to receive the encryption keys 946.

The keys server 146 contacts the authorization server 166 to check if the request made by the ID upload server 126 is authorized 947. The authorization server 166 passes the confirmation to the keys server 146 in 948.

The keys server 146 returns the requested keys to the ID upload server 126 in 949.

The ID upload server 126 returns the requested document image to the partner user interface 133 in 950 via the API gateway 114.

The ID upload server 126 contacts the notification server 186 to send an email notification via a messaging intermediary 309 in 951. A present implementation includes two types of notifications. The first type includes the submission notifications, which are triggered when the documents for a submission are uploaded, and processed using web hooks. The first type is triggered through the Google Cloud Platform™. The second type includes the onboarding emails sent to new administrative users and/or agents through sendgrid. If the submission is reviewed, and the submission's category has the webhook option enabled, the ID upload server 126 contacts the notification server 186 to send a web hook notification to the customer. Otherwise, the notification server 186 sends an email (e.g. through sendgrid) to the customer. When adding a newly created agent, notification server 186 sends a request to provide his ID details.

The partner user interface 133 sends statistics received from other servers to the statistics server 196 for storage 954.

The partner user interface 133 sends the activity logs to activity server 166 in 955 through API gateway 114. The activity server 166 sends the statistics to the API gateway 114 to be displayed by the partner user interface 133 in 956.

The ID upload server 126 also sends activity logs to the activity server 166.

Workflow

Figure 10:
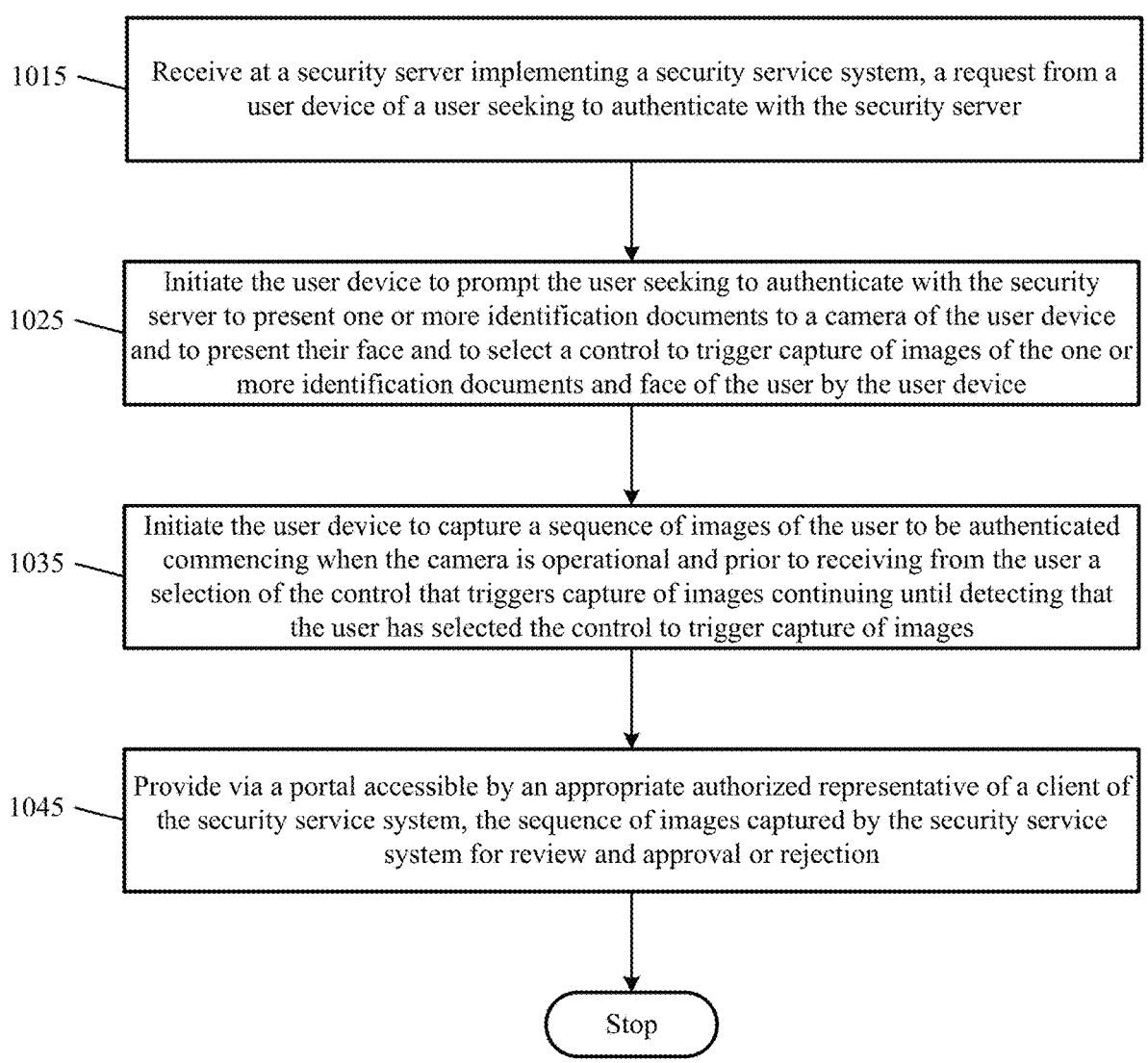
FIG. 10 shows a representative method for detecting fraudulent activity during authenticating users and user identifications.

FIG. 10 is a flowchart showing a representative method for detecting fraudulent activity during authenticating users and user identifications. Flowchart 1000 in FIG. 10 can be implemented at least partially with a computer or other data processing system; e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this flowchart is described with reference to the system that carries out a method. The system is not necessarily part of the method.

FIG. 10 begins with action 1015, in which a security server of implementing a security service system, validation platform 116, receives a request from a user device of a user seeking to authenticate with the security server.

Process 1000 continues at action 1025, in which a security server of validation platform 116 initiates the user device to prompt the user seeking to authenticate with the security server to present one or more identification documents to a camera of the user device and to present their face and to select a control to trigger capture of images of the one or more identification documents and face of the user by the user device.

Action 1035 includes the security server of validation platform 116 initiating the user device to capture a sequence of images of the user to be authenticated commencing when the camera is operational and prior to receiving from the user a selection of the control that triggers capture of images continuing until detecting that the user has selected the control to trigger capture of images. Accordingly, validation platform 116 can thereby enable capture of activity performed by the user prior to and contemporaneous with selecting the control, including any attempted fraudulent activity of the user to be authenticated.

At action 1045, a security server of validation platform 116 provides the sequence of images captured by the security service system to an appropriate authorized representative of a client of the security service system for review and approval or rejection via a portal.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as terminology, introduction, and system overview.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

Particular Implementations

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A method implementation of the technology disclosed includes receiving at a security server implementing a security service system, a request from a user device of a user seeking to authenticate with the security server, and initiating the user device to prompt the user seeking to authenticate with the security server to present one or more identification documents to a camera of the user device and to present their face and to select a control to trigger capture of images of the one or more identification documents and face of the user by the user device. The method implementation further includes initiating the user device to capture a sequence of images of the user to be authenticated commencing when the camera is operational and prior to receiving from the user a selection of the control that triggers capture of images continuing until detecting that the user has selected the control to trigger capture of images. The method thereby enables capture of activity performed by the user prior to and contemporaneous with selecting the control, including any attempted fraudulent activity of the user to be authenticated. The method implementation can further include providing via a portal accessible by an appropriate authorized representative of a client of the security service system, the sequence of images captured by the security service system for review and approval or rejection.

In some method implementations, initiating the user device to capture a sequence of images includes initiating capturing live video images of the user as the user is interacting with the device and initiating capture of at least one still image. Further, some implementations include initiating capturing of live audio of the user as the user is interacting with the device.

Some method implementations further include triggering display by the user device of a live video image of the user. The live video image displayed comprising a close up presentation of their head and having a narrower field of view than the camera of the user device. The camera of the user device captures imagery of at least one of background and periphery including any objects and actions therein. The method thereby enables avoiding making the user aware that the camera of the user device is capturing the imagery of at least one of background and periphery. Further, some implementations include commanding the camera of the device to adjust focus to capture activity in the background and periphery. Yet further, in some method implementations, initiating the user device to capture a sequence of images of the user to be authenticated includes capturing a temporal sequence of 10 to 20 frames of the user, including the background and the periphery commencing prior to the user activating the control of the camera, as well as capturing at least one snapshot including a close up presentation of a user's head and having a narrower field of view than the camera of the user device.

Some implementations can reveal to an authorized representative a chain of evidence indicating that a crime is being committed by storing in an activity database an activity data structure for each of a plurality of authentication attempts, including legitimate authentication attempts and fraudulent authentication attempts. The activity data structure can include an activity attribute selected from a geolocation, a machine identifier and a network based identifier. A selection indicating interest in a particular activity data structure representing one of the plurality of authentication attempts is received from the authorized representative. The method implementation searches the activity database for additional activity data structures having one or more activity attributes related to the particular activity data structure selected and provides results of the search to the authorized representative. The method implementation can thereby reveal to the authorized representative a set of authentication attempts related by the one or more activity attribute and indicating criminal activity.

In some method implementations, searching the activity database includes detecting patterns of behavior of users being authenticated that indicate criminal activity. In some method implementations, detecting patterns of behavior of users being authenticated that indicate criminal activity includes detecting at least one selected from a common picture, a common background and a common ID used in different authentication activities. In some method implementations, initiating searching the activity database includes performing an elastic search. Further some implementations include storing in the activity database a time when an authentication is submitted, a time when an authentication request is created. Yet further, some implementations including responsive to receiving an indication from the authorized representative that a particular activity is fraudulent, actions including: marking the particular activity as fraudulent; searching the database for related activities; and presenting to the authorized representative for review any related activities uncovered by searching.

Some method implementations further include using the activity database, tracking events performed by the authorized representative of a client of the security service. Some method implementations further include storing in the activity database a time when an authentication is submitted, a time when an authentication request is created.

Some method implementations further include sending the user device a link prompting the user to authenticate with the security server. Further, some implementations receive from the user device a request to perform an action requires the user to authenticate with the security service. Yet further, some implementations receive from the authorized representative of the client of the security service system, a configurable set of criteria required for the user to authenticate with the client.

Some method implementations further include creating an encryption key and using the encryption key to encrypt the sequence of images as a string base 64. The string base 64 format images are stored on a server inaccessible to the user being authenticated.

Still yet further, some method implementations include authenticating using an authorization server, the authorized representative of a client account using a subscription server.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Computer System

Figure 11:
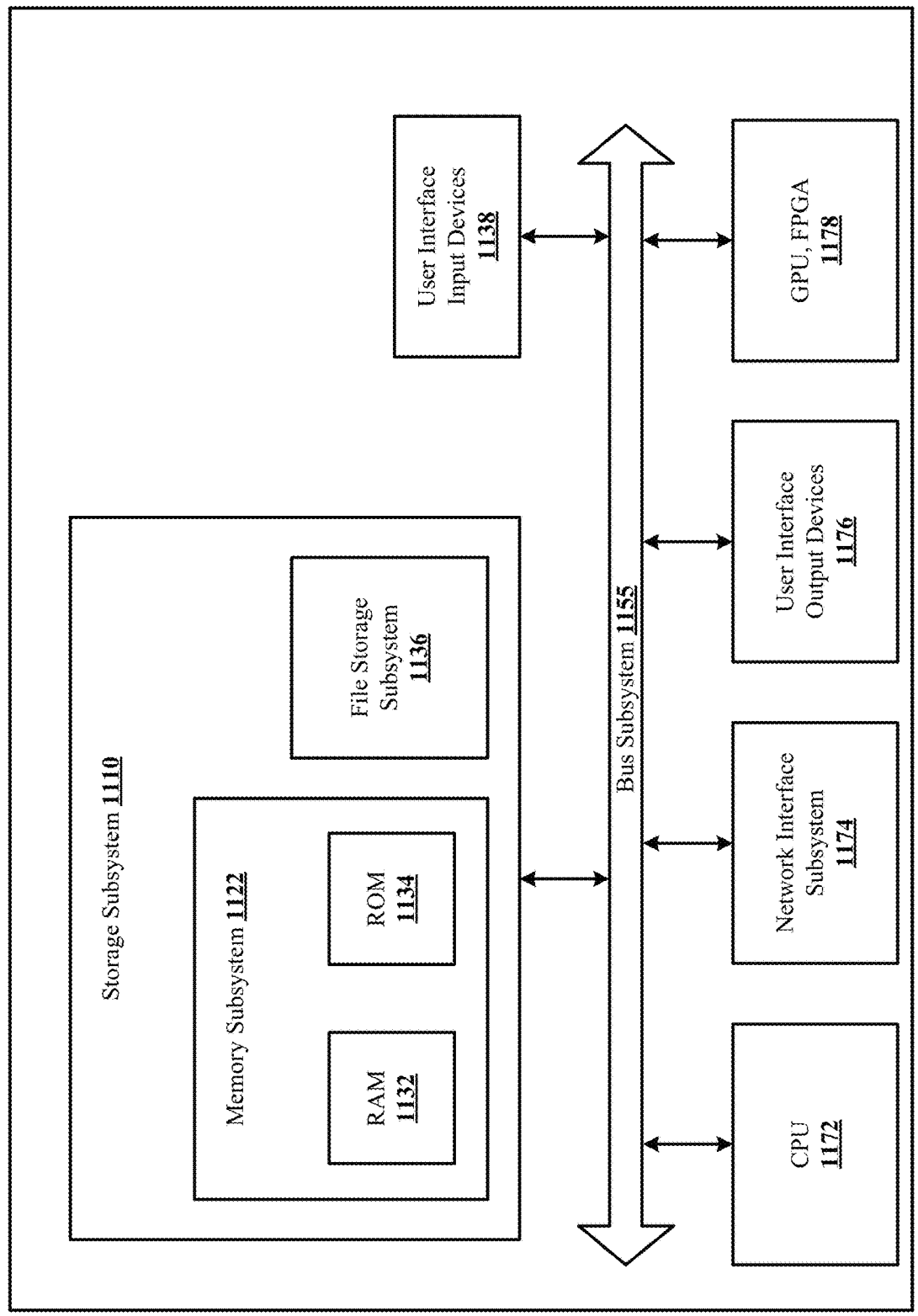
FIG. 11 is a simplified block diagram of a computer system 1100 that can be used to implement detecting fraudulent activity during authenticating users and user identifications.

FIG. 11 is a simplified block diagram of a computer system 1100 that can be used to implement detecting fraudulent activity during authenticating users and user identifications. Computer system 1100 includes at least one central processing unit (CPU) 1172 that communicates with a number of peripheral devices via bus subsystem 1155. These peripheral devices can include a storage subsystem 1110 including, for example, memory devices and a file storage subsystem 1136, user interface input devices 1138, user interface output devices 1176, and a network interface subsystem 1174. The input and output devices allow user interaction with computer system 1100. Network interface subsystem 1174 provides an interface to outside networks, including an interface to corresponding interface devices in other computer systems.

In one implementation, the cloud-based network security system (NSS) 135 of FIG. 1 is communicably linked to the storage subsystem 1110 and the user interface input devices 1138.

User interface input devices 1138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1100.

User interface output devices 1176 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1100 to the user or to another machine or computer system.

Storage subsystem 1110 stores programming and data constructs that provide the functionality of some or all of the modules and methods described herein. Subsystem 1178 can be graphics processing units (GPUs) or field-programmable gate arrays (FPGAs).

Memory subsystem 1122 used in the storage subsystem 1110 can include a number of memories including a main random access memory (RAM) 1132 for storage of instructions and data during program execution and a read only memory (ROM) 1134 in which fixed instructions are stored. A file storage subsystem 1136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1136 in the storage subsystem 1110, or in other machines accessible by the processor.

Bus subsystem 1155 provides a mechanism for letting the various components and subsystems of computer system 1100 communicate with each other as intended. Although bus subsystem 1155 is shown schematically as a single bus, alternative implementations of the bus subsystem can use multiple busses.

Computer system 1100 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1100 depicted in FIG. 11 is intended only as a specific example for purposes of illustrating the preferred embodiments of the present disclosed technology. Many other configurations of computer system 1100 are possible having more or less components than the computer system depicted in FIG. 11.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and Yahoo! S4™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

A Base64 is a binary-to-text encoding scheme that represents binary data in an ASCII string format by translating it into a radix-64 representation. Each Base64 digit represents exactly 6 bits of data. Three 8-bit bytes (i.e., a total of 24 bits) can therefore be represented by four 6-bit Base64 digits. Common to all binary-to-text encoding schemes, Base64 is designed to carry data stored in binary formats across channels that only reliably support text content. Base64 is used embed image files or other binary assets inside textual assets such as HTML and CSS files. A byte is a basic storage unit used in many integrated circuit logic and memory circuits, and consists of eight bits. Basic storage unit can have other sizes, including for example one bit, two bits, four bits, 16 bits and so on. Thus, the description of a string 64 data string set out above, and in other examples described herein utilizing the term byte, applies generally to circuits using different sizes of storage units, as would be described by replacing the term byte or set of bytes, with storage unit or set of storage units. Also, in some embodiments different sizes of storage units can be used in a single command sequence, such as one or more four bit storage units combined with eight bit storage units.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for detecting fraudulent activity during authenticating users and user identifications, including:
   receiving at a security server implementing a security service system, a request to authenticate a user device of a user with the security server;
   wherein the request was generated subsequent to the user device prompting the user seeking to authenticate with the security server to present one or more identification documents to a camera of the user device and to present their face and to select a control to trigger capture of images of the one or more identification documents and face of the user by the user device;
   obtaining a sequence of images of the user to be authenticated, the sequence of images including images captured commencing when the camera is operational and prior to receiving from the user a selection of the control that triggers capture of images, thereby enabling the sequence of images to have captured activity performed by the user prior to and contemporaneous with selecting the control, including any attempted fraudulent activity of the user seeking to be authenticated;
   wherein a live video image of the user was displayed by the user device when the sequence of images was captured, the live video image displayed comprising a close up presentation of at least a portion of the user's person and having a narrower field of view than the camera of the user device, so that the sequence of images includes images comprising at least one of background or periphery including any objects and actions therein and wherein capture of the at least one of background or periphery including any objects and actions is not indicated to the user; and
   providing for review via a portal accessible by an authorized representative of a client of the security service system, the sequence of images obtained, and based on the review of the sequence of images, marking, by the authorized representative, the request to authenticate as approved or as rejected.

2. The method of claim 1, wherein initiating obtaining a sequence of images further includes initiating capturing live video images of the user as the user is interacting with the user device and initiating capture of at least one still image.

3. The method of claim 2, further including initiating obtaining live audio of the user as the user is interacting with the user device.

4. The method of claim 1, further including commanding the camera of the user device to adjust focus to capture activity in the at least one of background and periphery.

5. The method of claim 1, wherein initiating obtaining a sequence of images of the user to be authenticated includes capturing a temporal sequence of 10 to 20 frames of the user, including the at least one of background and the periphery commencing prior to the user activating the control of the camera; and
   capturing at least one snapshot including a close up presentation of a user's head and having a narrower field of view than the camera of the user device.

6. The method of claim 1, further including revealing to an authorized representative a chain of evidence indicating that a crime is being committed by:
   storing in an activity database an activity data structure for each of a plurality of authentication attempts, including legitimate authentication attempts and fraudulent authentication attempts, the activity data structure including an activity attribute selected from a geolocation, a machine identifier and a network based identifier;
   receiving from the authorized representative a selection indicating interest in a particular activity data structure representing one of the plurality of authentication attempts;
   searching the activity database for additional activity data structures having one or more activity attributes related to the particular activity data structure selected; and
   providing results of the search to the authorized representative; thereby revealing to the authorized representative a set of authentication attempts related by the one or more activity attribute and indicating criminal activity.

7. The method of claim 6, wherein searching the activity database includes detecting patterns of behavior of users being authenticated that indicate criminal activity.

8. The method of claim 7, wherein detecting patterns of behavior of users being authenticated that indicate criminal activity includes detecting at least one selected from a common picture, a common background and a common ID used in different authentication activities.

9. The method of claim 6, wherein searching the activity database includes performing a search of data entries for activity occurring in the security service system logged in a non-relational format in an activity database.

10. The method of claim 6, further including storing in the activity database a time when an authentication is submitted, a time when an authentication request is created.

11. The method of claim 6, further including responsive to receiving an indication from the authorized representative that a particular activity is fraudulent:
    marking the particular activity as fraudulent;
    searching the activity database for related activities; and
    presenting to the authorized representative for review any related activities uncovered by searching.

12. The method of claim 6, further including using the activity database, tracking events performed by the authorized representative of a client of the security service system.

13. The method of claim 6, further including storing in the activity database a time when an authentication is submitted, a time when an authentication request is created.

14. The method of claim 1, further including sending the user device a link prompting the user to authenticate with the security server.

15. The method of claim 14, further including receiving from the user device a request to perform an action requires the user to authenticate with the security service system.

16. The method of claim 14, further including receiving from the authorized representative of the client of the security service system, a configurable set of criteria required for the user to authenticate with the client.

17. The method of claim 1, further including:
    creating an encryption key;
    using the encryption key, encrypting the sequence of images as a string base 64; and
    storing the string base 64 on a server inaccessible to the user being authenticated.

18. The method of claim 1, further including authenticating using an authorization server, the authorized representative of a client account using a subscription server.

19. A non-transitory computer readable memory storing program instructions for detecting fraudulent activity during authenticating users and user identifications, which instructions when executed by one or more processors perform a method including:

receiving at a security server implementing a security service system, a request to authenticate a user device of a user with the security server;

wherein the request was generated subsequent to the user device to prompting the user seeking to authenticate with the security server to present one or more identification documents to a camera of the user device and to present their face and to select a control to trigger capture of images of the one or more identification documents and face of the user by the user device;

obtaining a sequence of images of the user to be authenticated, the sequence of images including images captured commencing when the camera is operational and prior to receiving from the user a selection of the control that triggers capture of images, thereby enabling the sequence of images to have captured activity performed by the user prior to and contemporaneous with selecting the control, including any attempted fraudulent activity of the user seeking to be authenticated; and wherein a live video image of the user was displayed by the user device when the sequence of images was captured, the live video image displayed comprising a close up presentation of at least a portion of the user's person and having a narrower field of view than the camera of the user device, so that the sequence of images includes images comprising at least one of background or periphery including any objects and actions therein and wherein capture of the at least one of background or periphery including any objects and actions is not indicated to the user;

providing for review via a portal accessible by an authorized representative, the sequence of images obtained, and based on the review of the sequence of images, marking, by the authorized representative, the request to authenticate as approved or as rejected.

20. A system for detecting fraudulent activity during authenticating users and user identifications, including:

a network interface that receives requests to authenticate from user devices equipped with cameras; and a security server including one or more processors coupled to memory storing instructions implementing a security service, which instructions when executed by the one or more processors:

receive via the network interface a request to authenticate a user device of a user seeking to authenticate;

wherein the request was generated subsequent to the user device prompting a user seeking to authenticate with the security server to present to a camera of their user device one or more identification documents and to present their face and to select a control to trigger capture of images of the one or more identification documents and face of the user by the user device;

obtain a sequence of images of the user to be authenticated, the sequence of images including images captured commencing when the camera is operational and prior to receiving from the user a selection of the control that triggers capture of images, thereby enabling the sequence of images to have captured activity performed by the user prior to and contemporaneous with selecting the control, including any attempted fraudulent activity of the user seeking to be authenticated;

wherein a live video image of the user was displayed by the user device when the sequence of images was captured, the live video image displayed comprising a close up presentation of at least a portion of the user's person and having a narrower field of view than the camera of the user device, the sequence of images includes images comprising at least one of background or periphery including any objects and actions therein and wherein capture of the at least one of background or periphery including any objects and actions is not indicated to the user; and provide for review via a portal accessible by an authorized representative, the sequence of images obtained, and based on the review of the sequence of images, marking, by the authorized representative, the request to authenticate as approved or as rejected.

* * * * *